Aug. 25, 1953  C. E. KERR  2,650,009
APPARATUS FOR PACKING CONTAINERS
Filed March 14, 1949  14 Sheets-Sheet 4
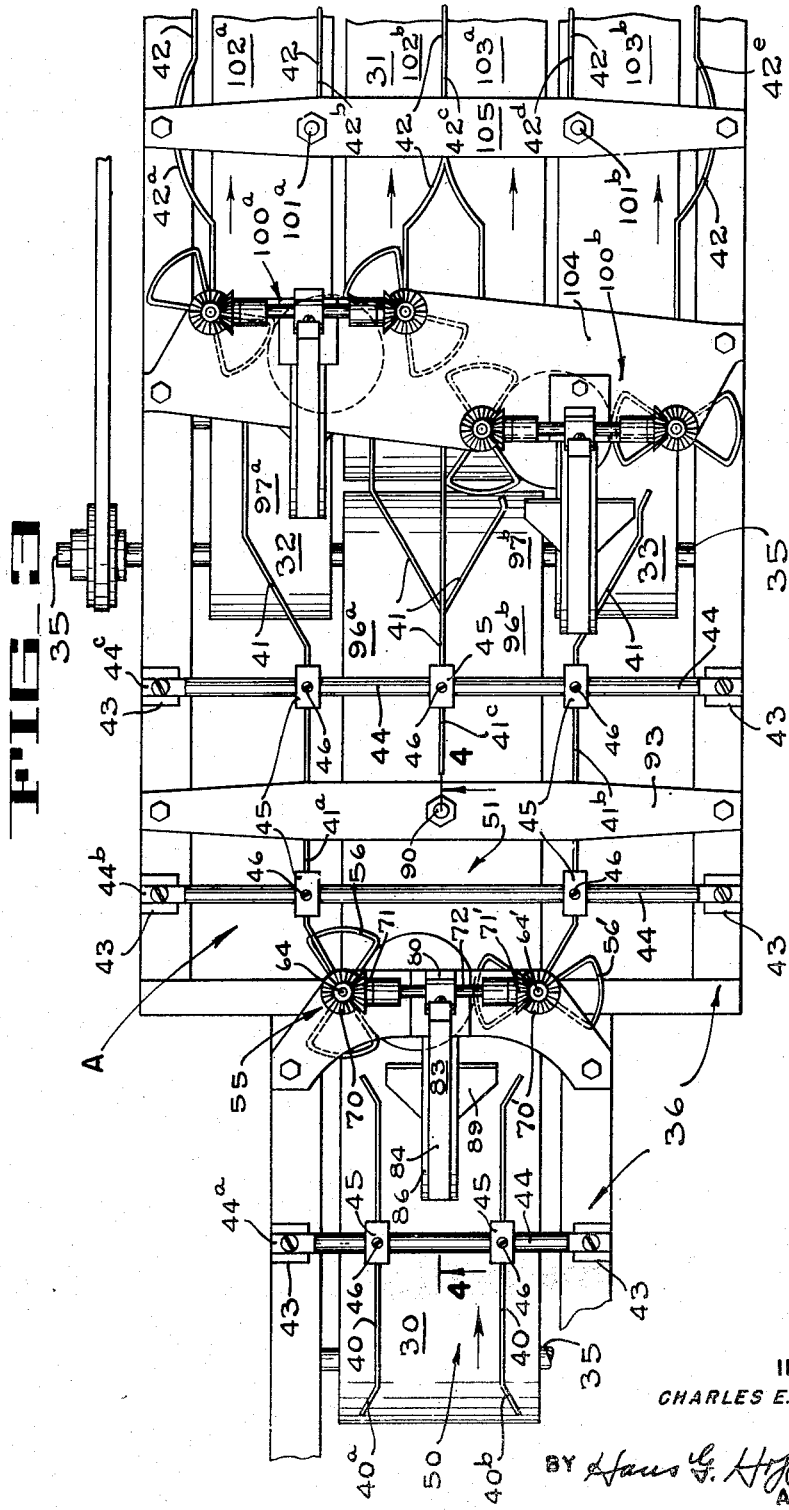
INVENTOR
CHARLES E. KERR
BY Hans G. Hoffmeister
ATTORNEY

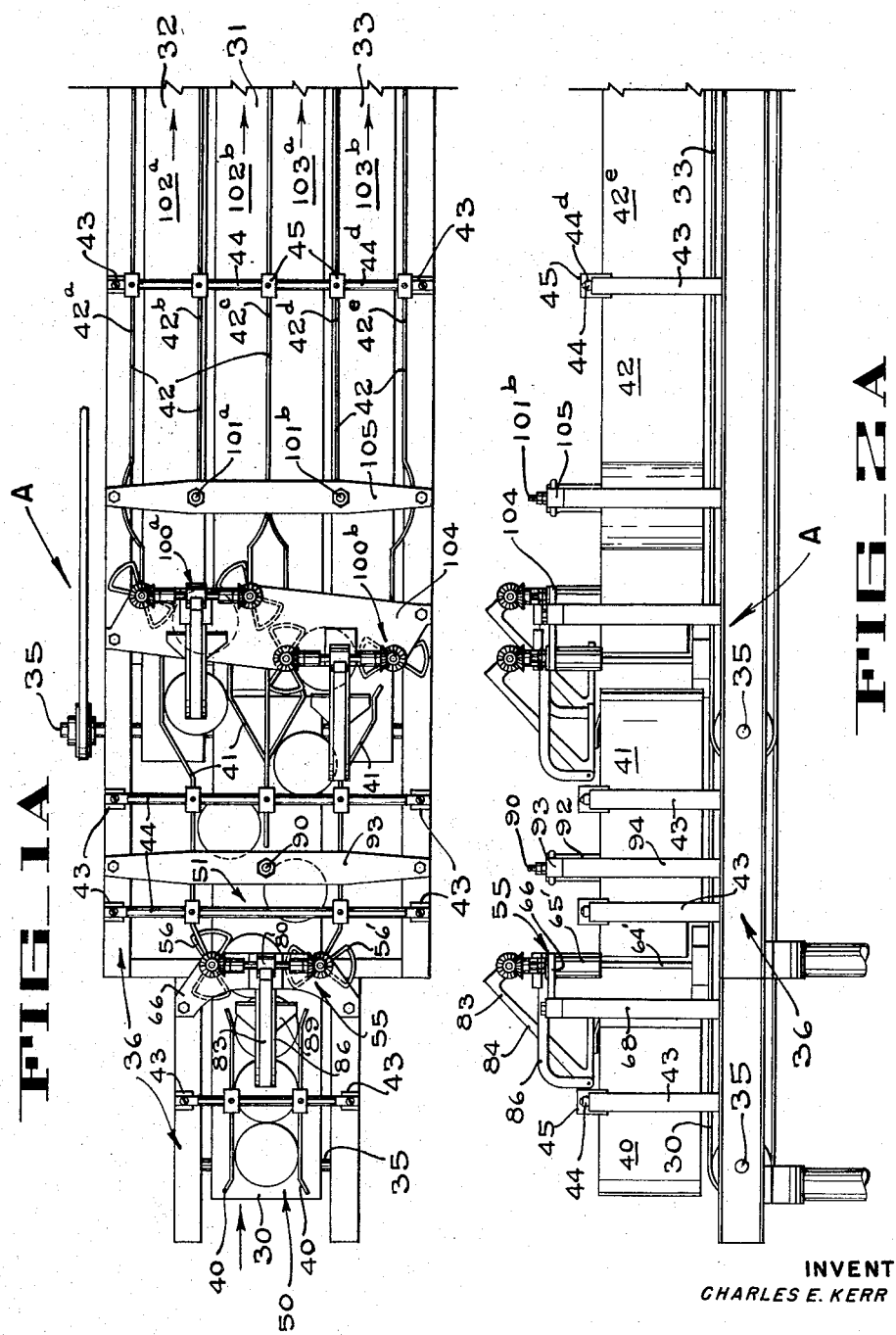

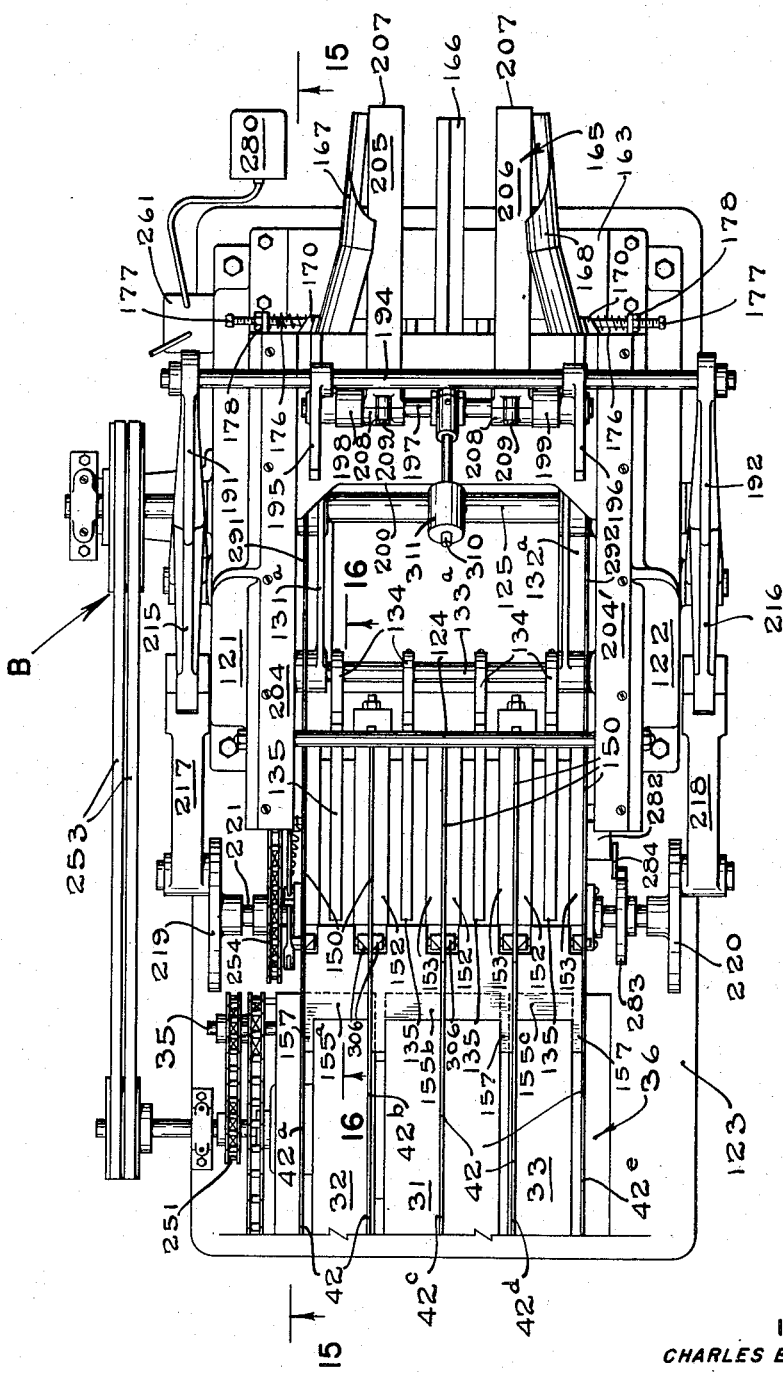

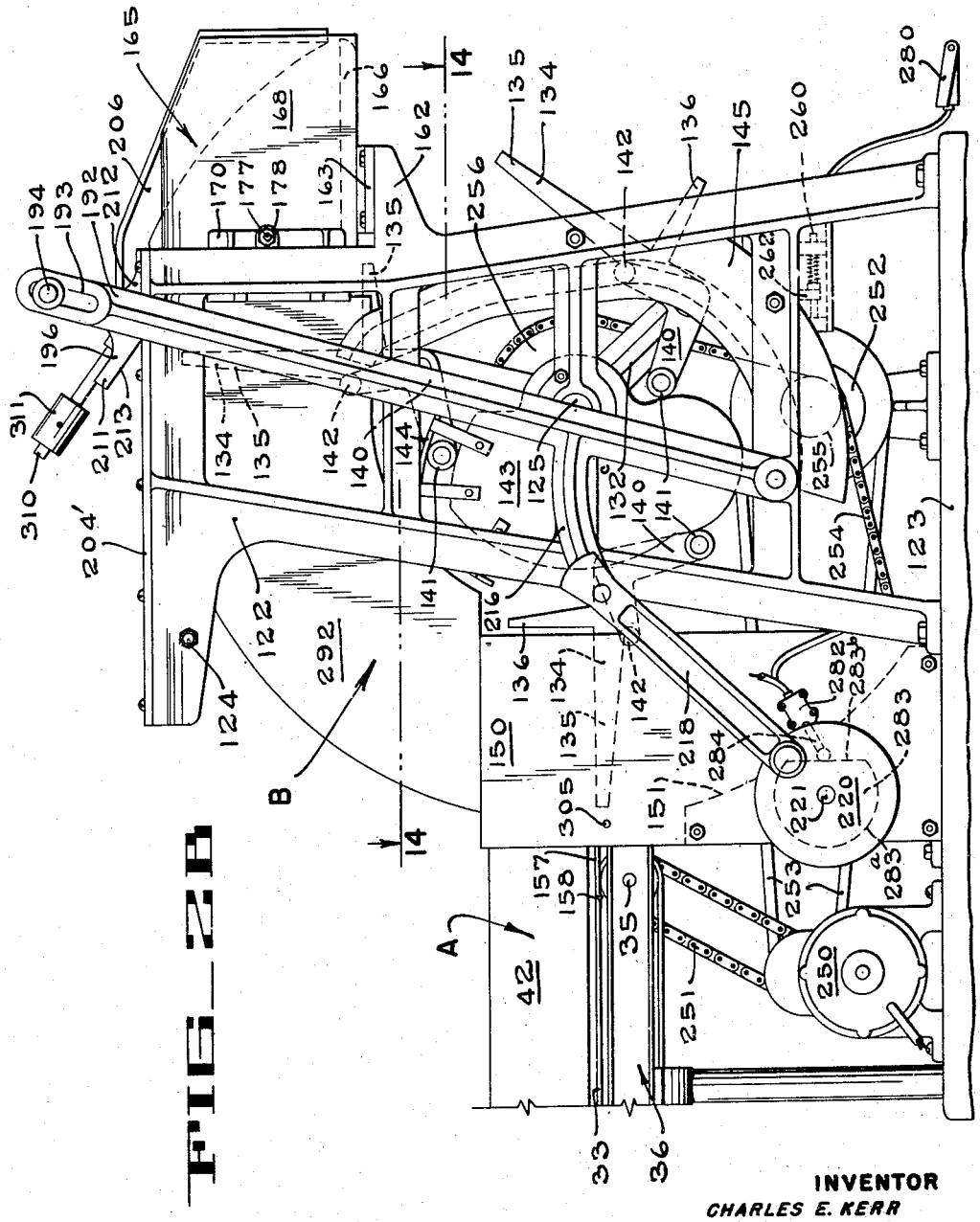

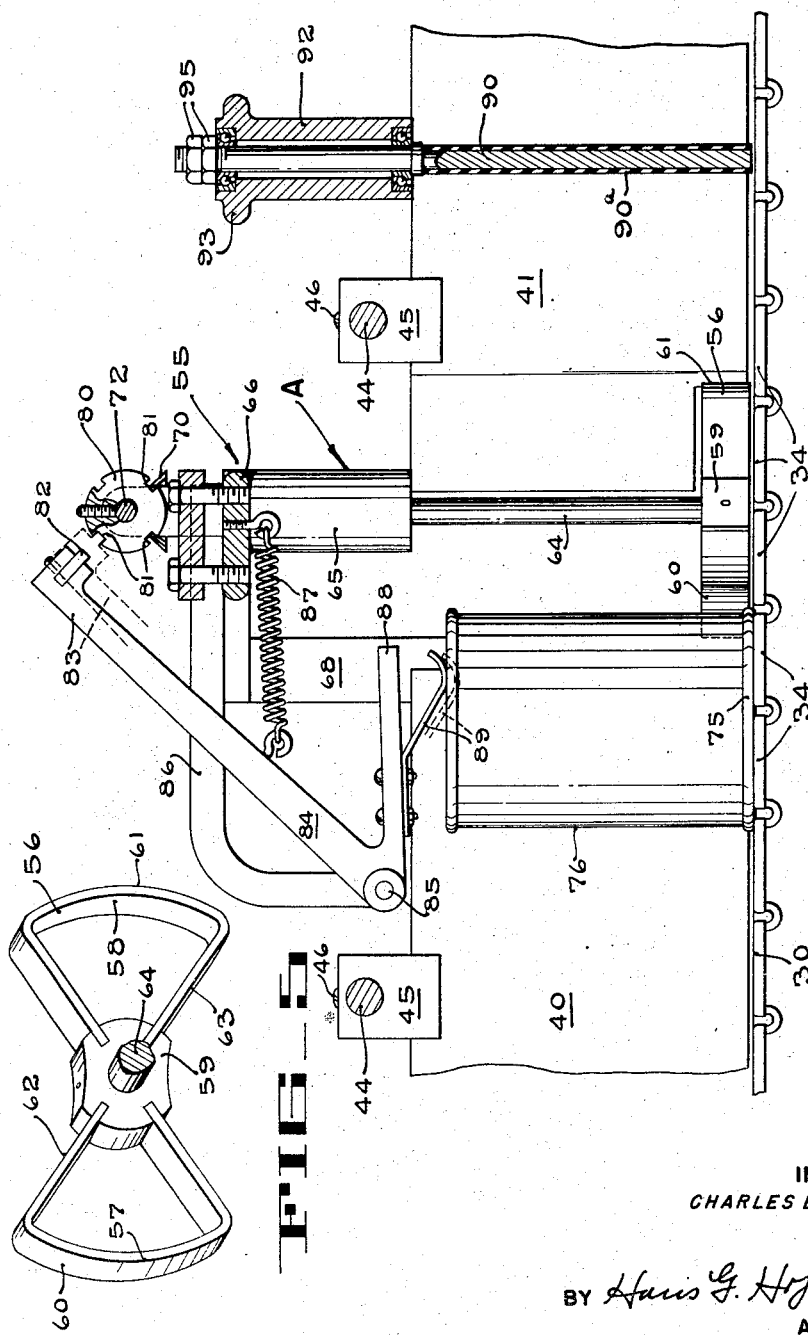

Aug. 25, 1953 C. E. KERR 2,650,009
APPARATUS FOR PACKING CONTAINERS
Filed March 14, 1949 14 Sheets-Sheet 6
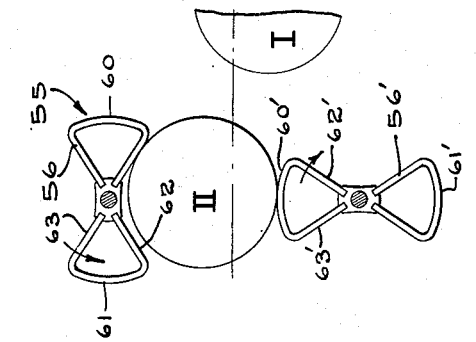
FIG_9
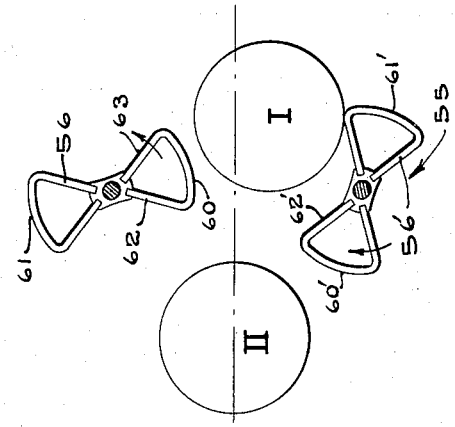
FIG_8
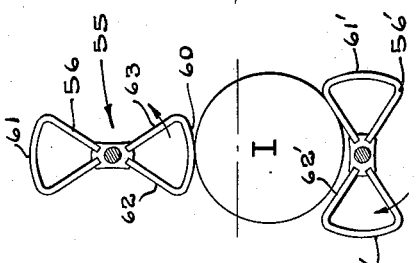
FIG_7
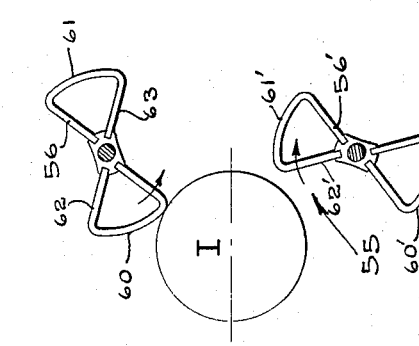
FIG_6
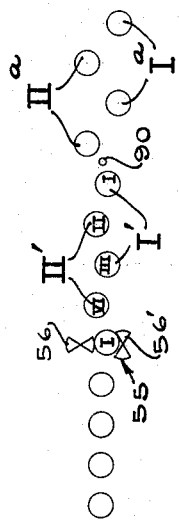
FIG_11
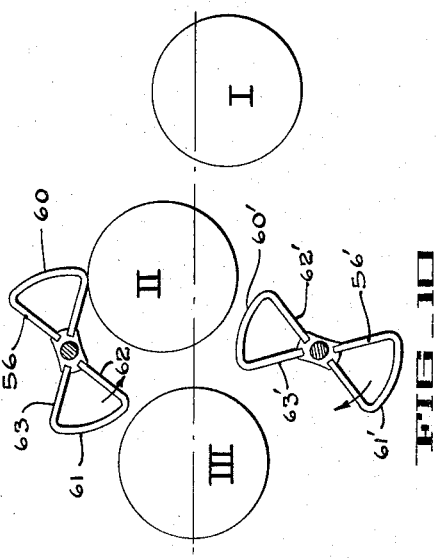
FIG_10
INVENTOR
CHARLES E. KERR
BY Hans G. Hoffmeister
ATTORNEY

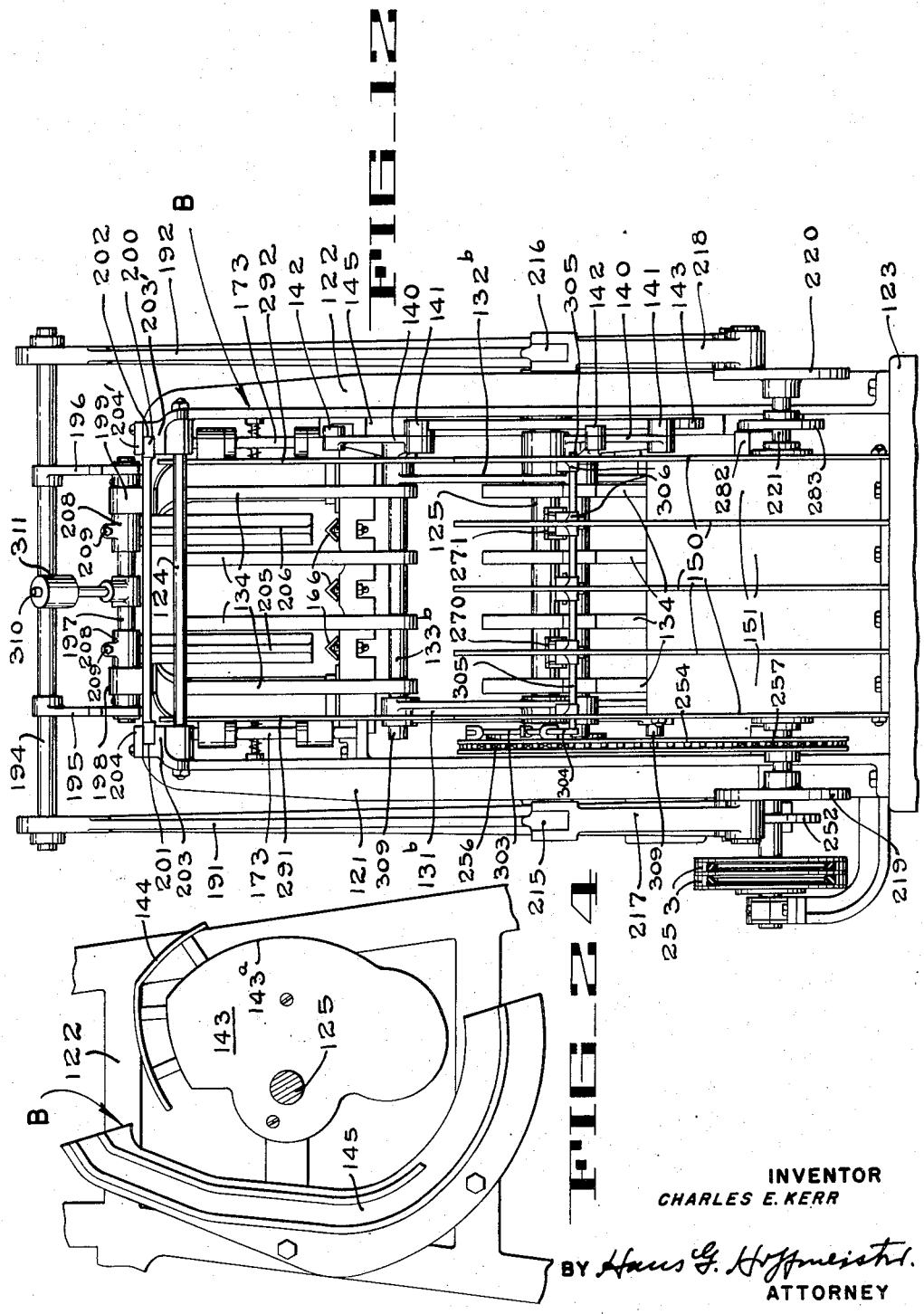

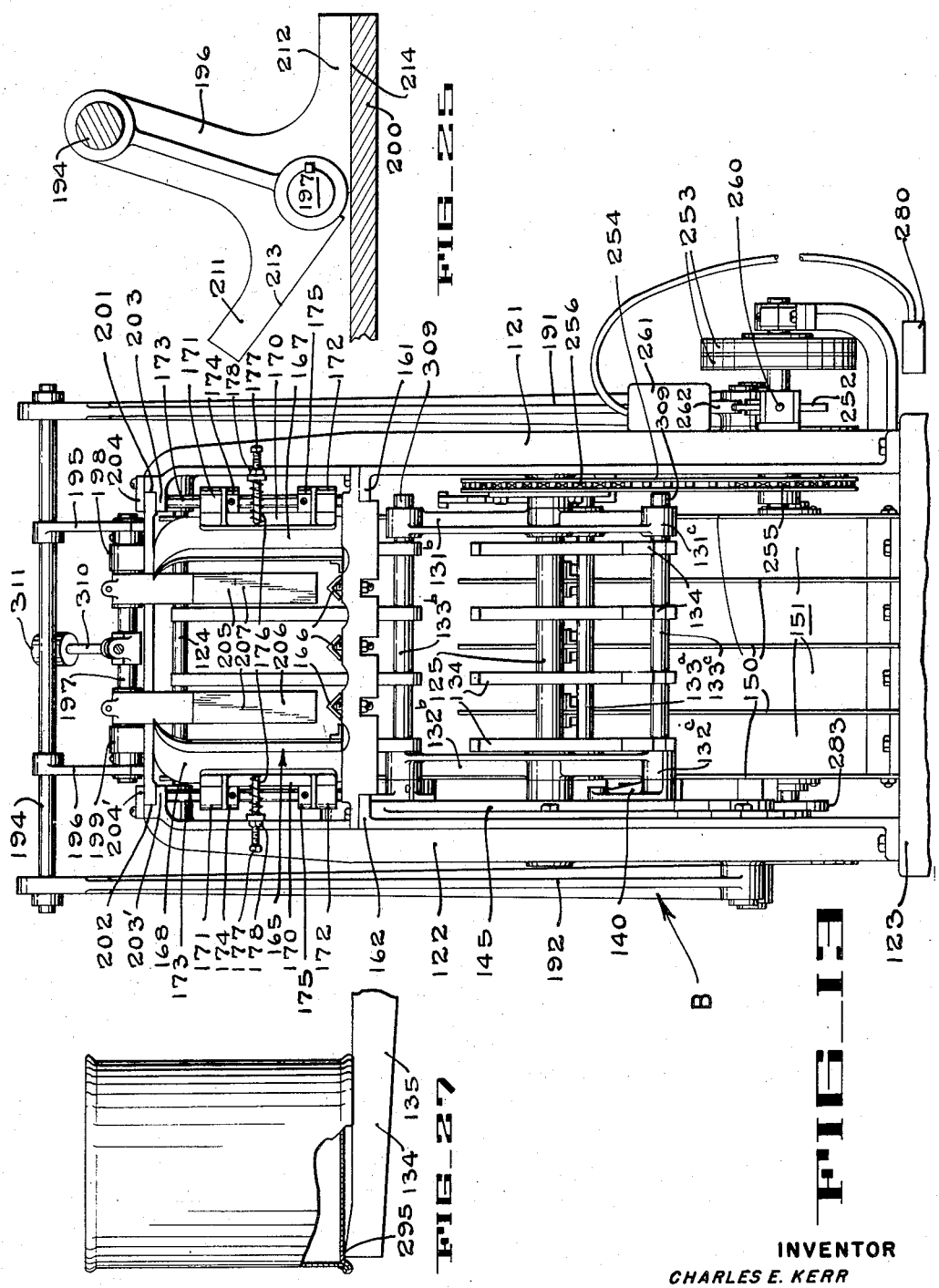

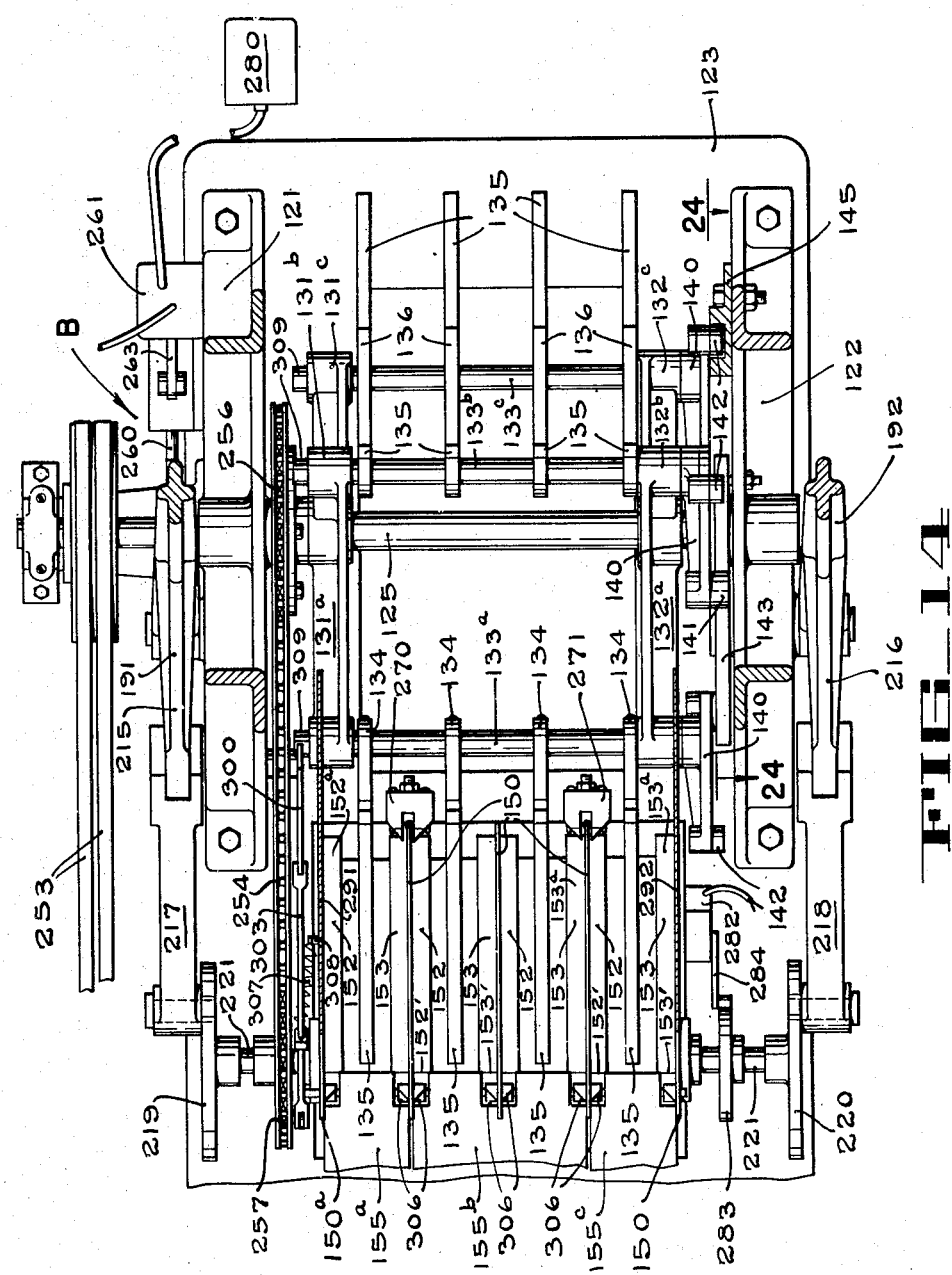

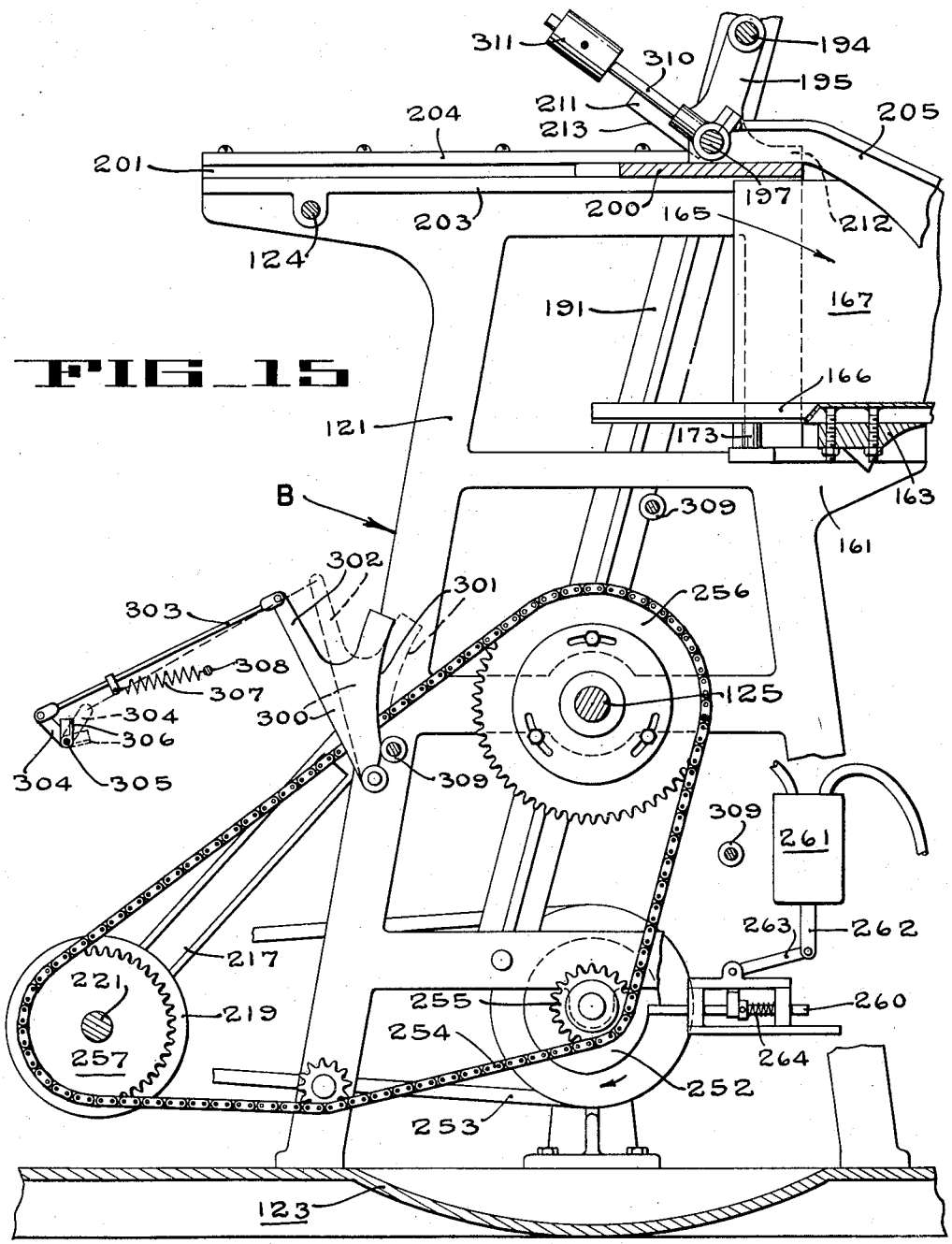

Aug. 25, 1953 C. E. KERR 2,650,009
APPARATUS FOR PACKING CONTAINERS
Filed March 14, 1949 14 Sheets-Sheet 11
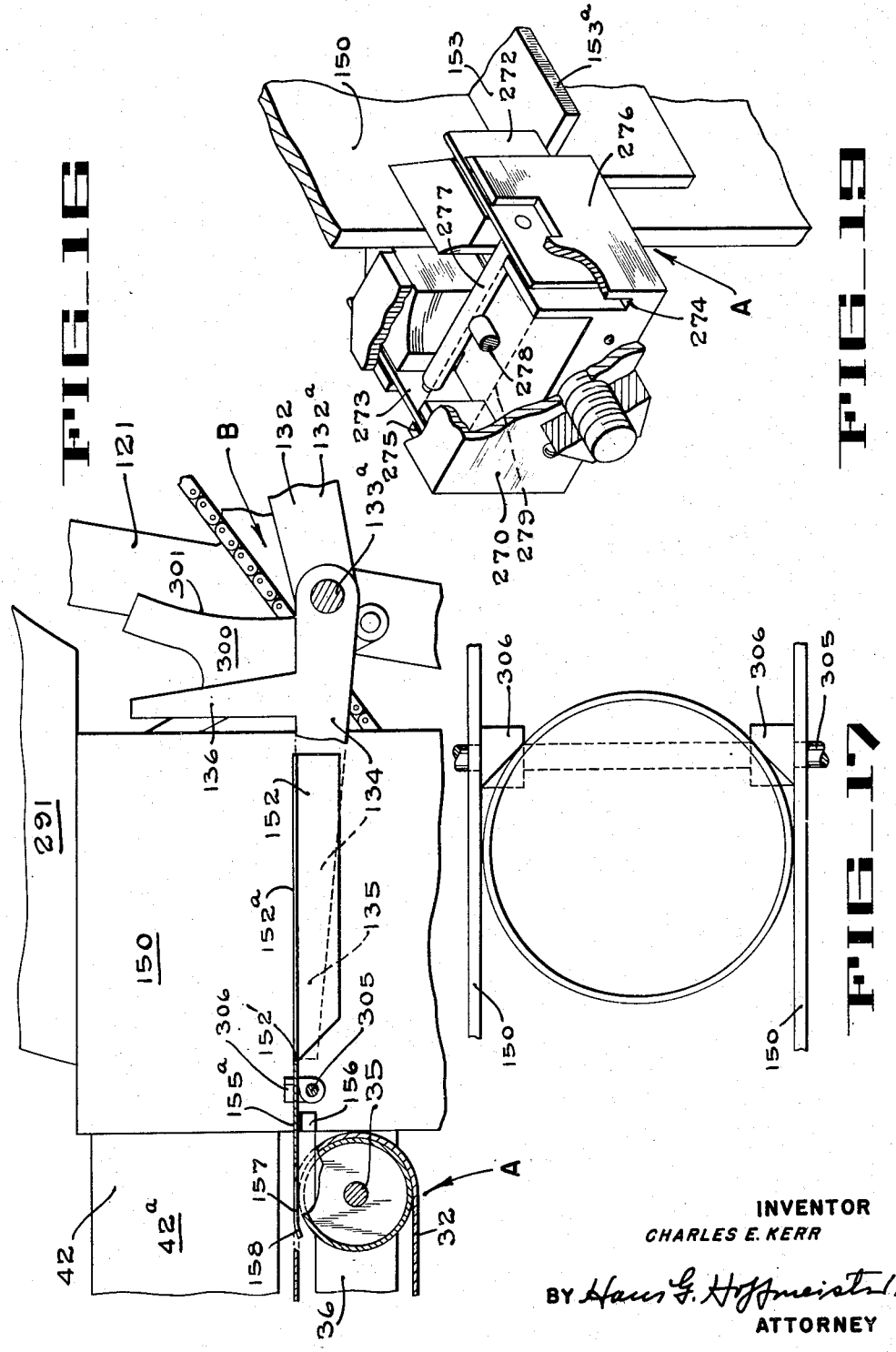
INVENTOR
CHARLES E. KERR
BY Hans G. Hoffmeister
ATTORNEY

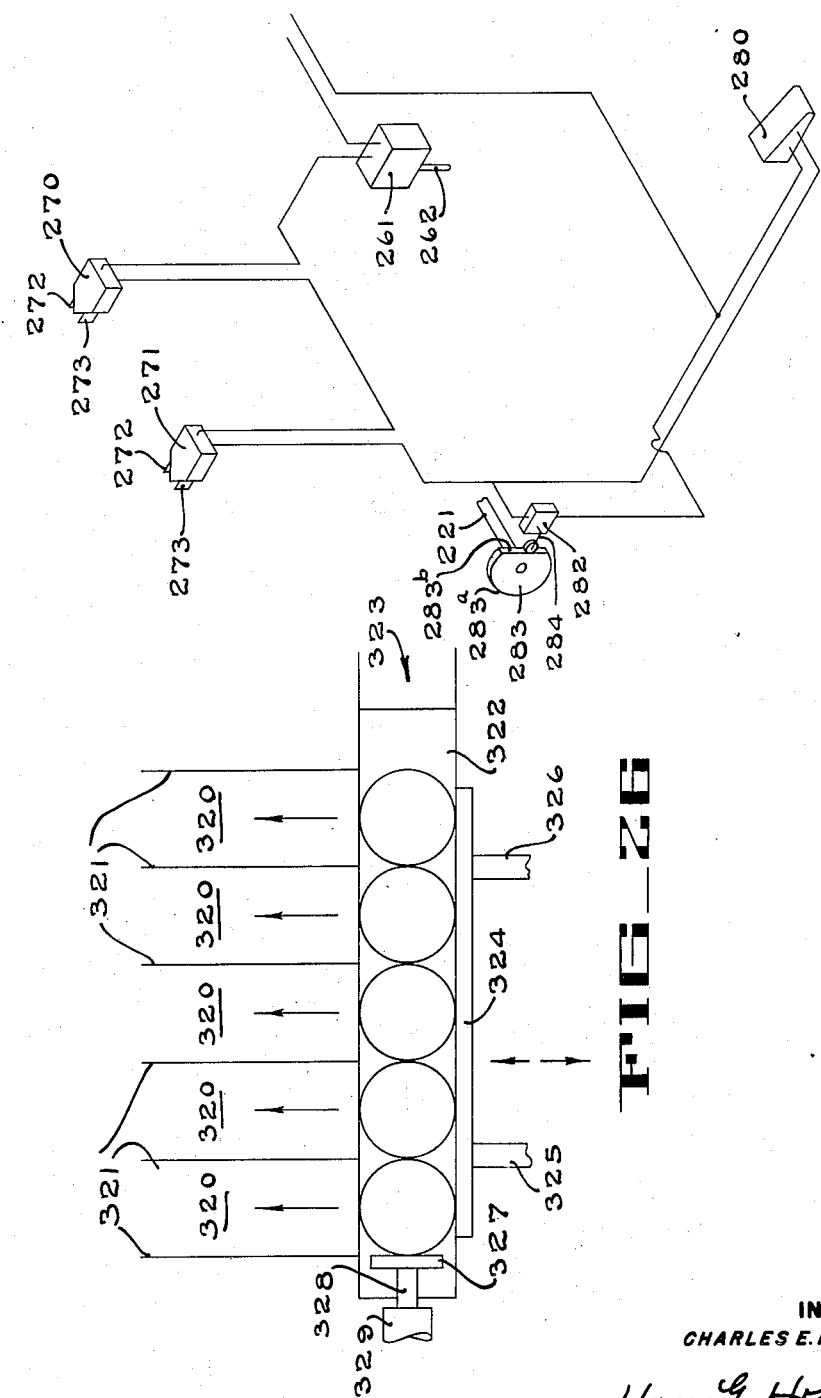

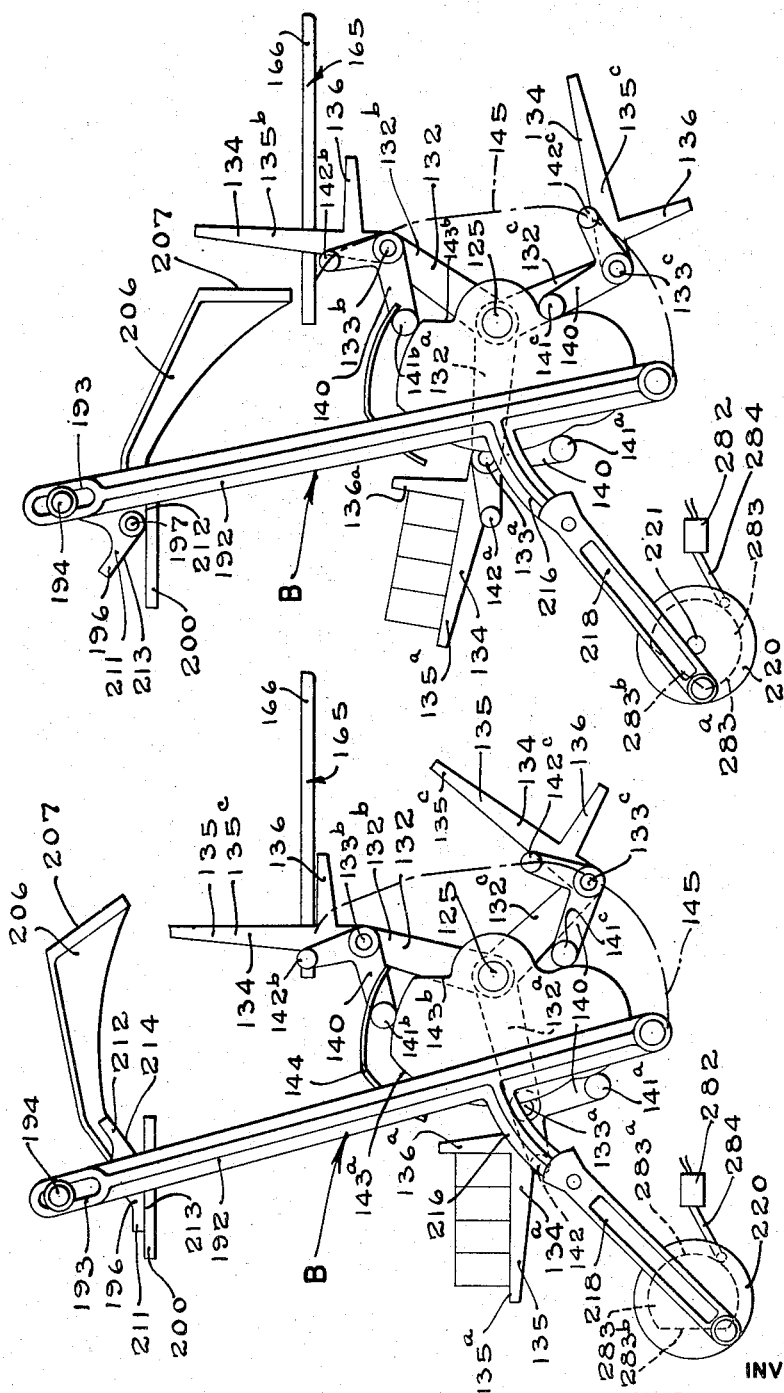

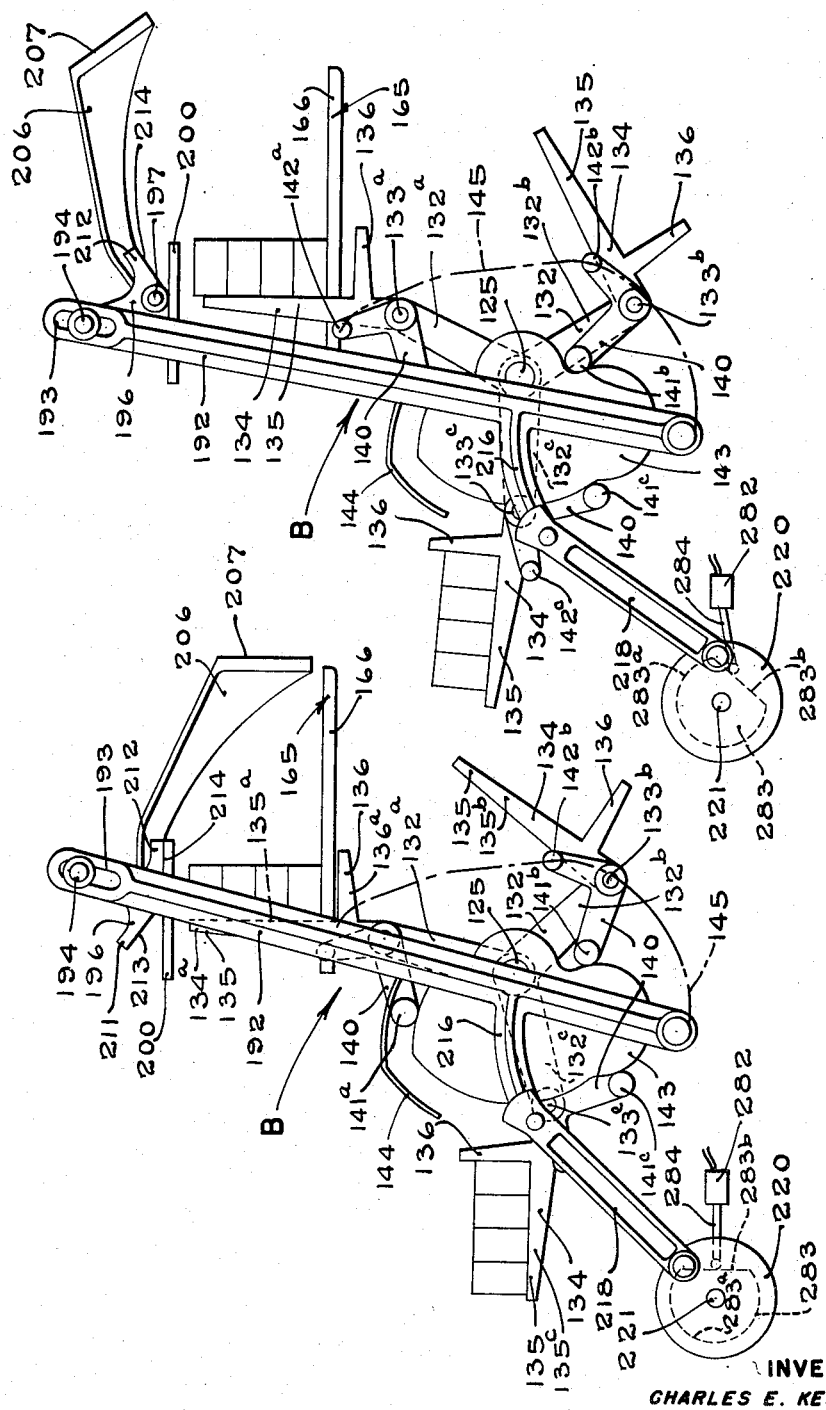

Patented Aug. 25, 1953

2,650,009

UNITED STATES PATENT OFFICE 2,650,009

APPARATUS FOR PACKING CONTAINERS

Charles E. Kerr, Hoopeston, Ill., assignor to Food Machinery and Chemical Corporation, San Jose, Calif., a corporation of Delaware Application March 14, 1949, Serial No. 81,254

38 Claims. (Cl. 226—14)

The present invention relates to mechanisms for packing containers for shipment. More particularly, the present invention relates to mechanisms for packing containers arriving in a single file supply line in superposed tiers into cases, cartons, crates or the like.

It is an object of the present invention to provide simple, yet effective, mechanisms for dividing a single-file container line into a plurality of separate lines.

Another object is to provide mechanisms for dividing a rapidly moving container line into a plurality of separate lines without subjecting the containers to harmful shocks, such as may dent their walls or spread their sealing seams.

Another object is to provide rapidly operating line-dividing mechanism of the type referred to, that acts so smoothly as to be safely applicable to containers of a fragile nature, such as glass jars, paper bottles, and the like.

Conversely, it is an object of the present invention to provide a simple and efficient mechanism for rapidly merging a plurality of separate container lanes into a single-file line in such a smooth manner that there is no danger of damaging the containers, whether they be made from metal, glass, or paper.

Another object is to provide a line-dividing mechanism, of the type referred to, that is adapted to properly divide a container line no matter how irregularly the moving containers may be spaced from one another.

A further object is to provide apparatus adapted to remove a predetermined number of containers from a container-supply line and place them in superposed tiers into a case, crate, or the like.

Another object is to provide apparatus, of the type referred to, that is adapted to remove container tiers of predetermined size from a multifile supply line and place a predetermined number of such tiers in superposed condition into a shipping case or the like.

Still another object is to provide a container casing machine, of the type referred to, that is not limited to containers of cylindrical shape but may also be employed to handle containers of angular cross section.

Another object is to provide a machine adapted to pack containers, arriving on a supply line, in superposed tiers into cases, crates, cartons and the like, wherein the containers are at no time subjected to shocks so that the machine may safely be employed to pack containers made of glass, paper, or other fragile materials.

Another object is to provide an automatic container-casing machine, at the end of a multi-file container supply line, which is adapted to transfer tiers of containers from the end of said line onto a loading chute but is arranged to remain inoperative until the proper number of containers for each tier has assembled at the end of said line.

It is a further object to provide means in a container-casing machine, of the type described, that is automatically effective to restrain containers in excess of a predetermined number from participating in the transfer operation of said machine.

Another object is to provide a container-casing machine having a container receiving table, a loading chute and means for transferring container tiers of a predetermined size from said receiving station onto said loading chute, which comprises means effective to eject the container tiers deposited in said loading chute from said chute into a shipping case, or crate, after a predetermined number of said tiers has been deposited into said loading chute.

Still another object is to so arrange a machine, of the type referred to, that while said container-ejecting means is effective to push containers previously deposited into said chute forwardly out of said chute, said container transfer ring means operates to deposit an additional tier of containers into said chute rearwardly of said ejecting means.

Another object is to provide a machine, of the type referred to, which is adapted to be set into operation by attending personnel whenever the proper number of containers has assembled in its receiving station and which, once set into motion, is automatically effective to continue its operation until a case or crate is loaded with a predetermined number of container tiers.

These and other objects and advantages of the present invention will become apparent from the following description and accompanying drawings in which:

Figs. 1A and 1B are the left and right halves of a plan view of the complete line-dividing and case-loading machine.

Figs. 2A and 2B are the left and right halves of a side elevation of the complete machine, viewed from the right side thereof.

Fig. 3 is a fragmentary plan view of the line-dividing mechanism of my invention shown on a somewhat larger scale than Fig. 1A.

Fig. 4 is a vertical longitudinal section of part of the line-dividing mechanism taken along line 4—4 of Fig. 3.

Fig. 5 is a perspective view of a component of the line-dividing mechanism of my invention.

Figs. 6, 7, 8, 9 and 10 are schematic plan views of part of the line-dividing mechanism of my invention illustrating a progressive sequence of operational positions thereof.

Fig. 11 is another schematic plan view of the line-dividing mechanism of my invention illustrating the manner in which a single-file line of containers is converted into a double-file line.

Fig. 12 is a front elevation of the case-loading machine of my invention.

Fig. 13 is a rear elevation of the case-loading mashine.

Fig. 14 is a plan view of a horizontal section through the casing machine taken along lines 14—14 of Fig. 2B.

Fig. 15 is a vertical section through the casing machine taken along line 15—15 of Fig. 1B.

Fig. 16 is a vertical section taken along line 16—16 of Fig. 1B which illustrates that part of the machine where the containers are transferred from the supply line onto the receiving table of the case-loading machine.

Fig. 17 is a fragmentary plan view of the same station of the machine.

Fig. 18 is a circuit diagram illustrating the manner in which the operation of the case-loading machine is electrically controlled.

Fig. 19 is a perspective view illustrating suitable actuating mechanism for some of the switches employed in the control circuit shown in Fig. 18.

Figs. 20, 21, 22 and 23 are fragmentary side elevational views of the case-loading machine of the invention illustrating a progressive sequence of operational positions.

Fig. 24 is a vertical section through the cams which control the container transfer operation, taken along line 24—24 of Fig. 14.

Fig. 25 is a detail view illustrating in elevation a component part of the container ejecting mechanism associated with the case-loading chute of the machine of the invention.

Fig. 26 is a diagrammatical plan view of a modified container supply line for the case-loading machine of the invention.

Fig. 27 is a fragmentary side-elevational view illustrating a modified embodiment of the container transfer fingers employed in the case-loading machine of my invention.

Referring to Figs. 1A and 1B and 2A and 2B, the machine of the present invention is composed of a line-dividing mechanism A adapted to convert a single-file supply line of containers into a multi-file supply line, and a case-loading mechanism B adapted to transfer tiers of containers from the end of the multi-file supply line into a shipping case, crate, or the like.

The line-dividing mechanism A comprises two sequentially arranged endless conveyor belts 30 and 31 of sufficient width to support a double row of containers, with the forward part of the first and all of the second of said belts being flanked by a pair of narrow conveyor belts 32 and 33, respectively, which are each of sufficient width to support a single row of containers. Said conveyor belts 30—33 may each be composed of an endless sequence of hingedly connected plates or slats 34, as indicated in Fig. 4, and they are trained around suitable pulleys or rollers (only some of which are shown in the drawings) mounted upon transverse shafts 35. Said shafts are journaled in the frame structure 36 of the supply line which is formed by a plurality of parallel girders that rest upon tubular posts, as shown in Figs. 1A and 2A.

Held above the conveyor belts 30—33 are a plurality of parallel partitioning screens or plates 40, 41 and 42, which are arranged to form a plurality of container guiding channels or corridors, as shown in Figs. 1A and 3. To maintain said partitioning screens in their proper positions, pillars 43 are mounted in pairs upon the frame structure 36 at either side of the conveyor belts 30—33 and support cross rods 44 upon which are slidably arranged a number of blocks 45. The partitioning plates are fitted with their upper edges into suitable grooves or slots provided in said blocks, and by adjusting the position of said blocks upon said cross bars, transversely of the direction of movement of the conveyor belts, the width of the container guiding corridors may be varied to adapt them to containers of different diametrical width. Setting screws 46 are provided to lock said blocks in their adjusted positions, as shown in Fig. 4.

At the feed end of the above described conveyor assembly (Fig. 3) a first cross rod 44a holds two symmetrically shaped partitioning plates 40a and 40b at such a distance from one another as to form a channel 40 for a single row of containers. Second and third cross bars 44b and 44c hold another pair of symmetrically shaped plates 41a and 41b in such a position relative to one another as to form an adjoining channel or corridor 51 the initial portion of which expands from about the size of channel 50 to a size sufficient to accommodate a double row of containers.

In accordance with the present invention, a single-file line of containers is split into a pair of separate files in two consecutive steps: As a first step, alternate ones of the containers of the single-file line are pushed in opposite directions, laterally of their line of advance, to form a staggered partially separated double row, wherein consecutive containers are alternately positioned somewhat to the right or to the left of the original center line; thereafter said staggered double row encounters means which completes the separation into two distinctly separate rows. Such a two-step separation of a line operates much smoother and can be carried out must faster and with far less danger of injury to the containers than the conventional methods of separation.

Reverting to Figs. 1A and 3, the first divider unit collectively identified by the reference numeral 55 is located intermediately of the corridors 50 and 51 and consists principally of a gate formed by a pair of horizontally spaced rotors 56 and 56′ disposed at either side of the conveyor belt 30. Said rotors are of identical construction and in the following description the same reference numerals will, therefore, be used for the individual components of both, except that primes (′) may be employed to specifically identify the components of the right one of said rotors (viewed in the direction of the container advance), whenever it is necessary to distinguish between said right and left rotors.

Each of said rotors 56 and 56′ (Fig. 5) is composed of a pair of diametrically opposed cylinder sectors 57 and 58 of limited axial height which may be formed from strips of bronze, with the inner ends of their radial shanks affixed to a central hub 59. Thus, each of said rotors possesses a pair of diametrically opposite convex surfaces 60 and 61 which are separated by diametrically opposed nooks or corners 62 and 63 formed by the radial walls of the cylinder sectors 57 and 58. The rotors 56 and 56' are rotatably mounted at opposite sides of the channel formed by the corridors 50 and 51 and are mechanically coupled for rotation in a pre-established relation. For this purpose, the hubs of said rotors are keyed to the lower ends of vertical shafts 64 and 64', respectively, which are journaled in bearings 65 and 65' (Figs. 2A and 4). Said bearings are supported from a bridge structure 66 that spans the conveyor belt 30 and rests upon a pair of pillars 68 which rise from the machine frame 36 at either side of said conveyor belt. Pinned to the upper ends of said shafts 64 and 64' (Fig. 3) are miter gears 70 and 70', respectively, which mesh with miter gears 71 and 71' that are firmly mounted upon the opposite ends of a horizontal shaft 72 which is rotatably supported from said bridge structure 66. Thus, whenever one of said rotors is rotated, the other one is forced to turn at equal speed in an opposite direction. In accordance with the present invention, the angular position of said rotors is originally adjusted in such a manner that in operation the sections of one will precede the corresponding sections of the other by an angle of 90 degrees; thus, when a nook of one of said rotors moves into a position opposite to the other rotor, said other rotor presents one of its deflecting surfaces to said nook and vice versa.

Whenever a file of containers is conducted into and through the gate formed by the described rotors, said gate is automatically effective to shift consecutive containers of said file alternately in opposite lateral directions. Having specific reference to Figs. 6 to 10, let it be assumed that the conveyor belt 30 delivers a container I to the gate with the rotors 56 and 56' in the positions illustrated in Fig. 6. As said container strikes the deflecting surface 60 of the left hand rotor 56, it turns said rotor in counterclockwise direction and, in consequence thereof, is pushed by said deflector surface into the nook 62' of the right hand rotor 56' which is caused to turn in clockwise direction due to the fact that it is mechanically coupled to the rotor 56, as previously described. Fig. 7 illustrates the resultant position of the rotors 56, 56' and the container I and indicates that when the deflecting surface 60 of the left hand rotor 56 has reached its rightmost position, the container I has been shifted somewhat to the right of its original position and is fully nested within the nook 62' of the right hand rotor 56'. As the conveyor belt 30 continues to advance the container I, said container bears against the loading wall of the nook 62' and turns the right hand rotor 56' further in clockwise direction, until it may move freely out of said nook 62' and continue its advance along a line parallel to and somewhat to the right of its original line of advance. This leaves the rotors 56, 56' in the position illustrated in Fig. 8 which is the symmetrical image of their initial position, as illustrated in Fig. 6. A succeeding container II (Fig. 8) will therefore strike the deflecting surface 60' of the right hand rotor 56' and impart clockwise movement to said rotor which causes the deflector surface 60' to shift the container II to the left and into the nook 62 of the left hand rotor 56 that turns in counterclockwise direction whenever the right hand rotor is turned in clockwise direction (Fig. 9). Hence, the container II is caused to occupy a position somewhat to the left of its original position, and as the conveyor belt 30 continues to advance the container II, said container moves out of the nook 62 along a line parallel to and somewhat to the left of the center line of its original advance while the rotors 56, 56' are swung into the positions illustrated in Fig. 10 which are operationally identical with the positions illustrated in the initially discussed Fig. 6. Now the rotor 56 presents the opposite one of its deflecting surfaces, namely surface 61, to the third III of the approaching containers and as said third container passes through the gate 56, 56', it is shifted to the right in the same manner as described in connection with container I. Hence, container III lines itself up behind container I, whereas the next one IV in the succession of approaching containers will be shifted to the left and line itself up behind container II. Thus, the containers approaching the oscillating gate 56, 56' in a single-file line, emerge from said gate in an only partially separated double line I', II', as illustrated in Fig. 11.

Reverting to Fig. 4, it should be noted that the rotors 56, 56' are mounted with their bottom edges spaced only very slightly above the surface of the conveyor belt 30. As a result thereof, only the seams or beads 75 of the approaching containers will come into contact with the deflector surfaces and there is no danger that the less resistant body walls 76 of said containers are indented or otherwise damaged through impact against said deflector surfaces.

To prevent disorganization of the container shifting gate 55, due to improper position of its rotors 56 and 56' at the time a container arrives at the entrance thereof, the invention provides means automatically effective to lock the rotors in any one of the four positions, in which they are capable of properly receiving a container (i. e., the positions illustrated in Figs. 6 and 8 and their diametrically opposite counterparts), until a newly arriving container has moved sufficiently close to the gate to actuate the rotors and thus initiate the above described shifting operations. For this purpose, a collar 80 (Fig. 4) is fixed to the center portion of the horizontal shaft 72 which couples the rotors 56 and 56'. Said collar is provided with four angularly equi-spaced slots or notches 81, as shown in Fig. 4, and each of said slots is adapted to be engaged by a key 82 secured to the upper arm 83 of a bell crank lever 84, which turns on a horizontal pivot 85 that is supported from the previously described bridge structure 66 by means of suitable braces 86. A spring 87 is tensioned between the arm 83 of the bell crank lever 84 and the bridge 66 to urge the end of arm 83 against the collar 80 and cause the key 82 to drop into whatever notch 81 will move into registry therewith. The lower arm 88 of the bell crank 84 is arranged to extend centrally along the path of the approaching containers, directly before the entrance of the gate 55, and carries a spring finger 89 which has a transversely enlarged contact end (Fig. 3) that extends downwardly into the path of the approaching containers (Fig. 4.)

Thus, whenever a container approaches the gate 55 sufficiently to contact whatever deflecting surface of the rotors 56, 56' may be placed in its way it strikes its upper end against the finger 89 and cams it upwardly out of its way.

As a result thereof, the bell crank 84 is moved in counterclockwise direction against the urge of the spring 87, as viewed in Fig. 4 and withdraws the key 82 from whatever notch 81 it may engage at the time, so that the rotors 56, 56' are released for operation. As long as the arriving containers follow one another in a continuous procession, the key 82 will be unable to re-engage any one of the notches 81 in the collar 80, but whenever the continuity of the supply procession is interrupted, the spring 87 causes the key 82 to fall upon the collar 80 and drop into whatever notch 81 moves into registry therewith, after the last of the containers has passed the gate 55. Thus, the rotors 56, 56' are securely locked against overthrow which might place them into rotary positions that would prevent newly arriving containers from entering the gate 55.

To complete the initiated division of the container procession, a vertical rod 90 (Figs. 3, 4 and 11) is placed centrally into the path of the staggered container line I', II' emerging from the oscillating gate 55. Said rod is mounted for free rotation within a pair of vertically superposed ball bearings that are seated within a tubular boss 92 (Fig. 4) extending downwardly from a bridge member 93 which spans the conveyor belt 30. Said bridge member rests upon a pair of pillars 94, only one of which is shown in Fig. 2A, that rise from the frame structure 36 at either side of the conveyor belt 30. Suitable check nuts 95 engage the projecting upper end of the rod 90 and maintain said rod at an altitude at which its lower end is only slightly spaced from the surface of the conveyor belt 30.

As the containers emerge from the oscillating gate 55 in a procession wherein consecutive ones are alternately displaced in opposite directions laterally of the center line (Fig. 11), those displaced to the right impinge upon the rod 90 with their left forward segments and are immediately deflected further to the right, while those displaced to the left impinge upon said rod with their right forward segments and, hence, are shifted further to the left. As a result, the semi-divided double line I', II' emerging from the oscillating gate 55 is fully dissolved into two separate files Ia and IIa which proceed along separate corridors 96a and 96b (Figs. 1A and 3) formed by a dividing wall 41c that is supported from the center of the third cross rod 44c rearwardly of the rod 90. As shown in Fig. 4, the deflecting rod 90 is preferably sheathed in a cover of rubber 90a to avoid slippage, and thus cause instant deflection of the containers as they encounter said rod.

In the particular embodiment of the present invention illustrated in the accompanying drawings, each of the two container files formed by the sequential action of the shifting gate 55 and the divider rod 90 is again divided into a pair of separate files, so that the containers are actually delivered in four separate rows to the case-loading machine B. Having specific reference to Figs. 1A and 3, the corridors 96a and 96b are arranged to diverge to some extent as indicated at 97a and 97b and each corridor leads to another shifting gate 100a or 100b, respectively, which is followed by a dividing rod 101a or 101b. Each of said rods marks the beginning of twin channels 102a and 102b, and 103a and 103b formed by five partitioning plates or screens 42a, b, c, d and e which are suspended from a fourth cross rod 44d in the manner previously described. The two shifting gates 100a and 100b are preferably located at longitudinally displaced points of the container supply line to gain the necessary space for their inner rotors without need for spreading the container lanes further apart than indicated by the diametrical width of the processed containers. The oscillating gates 100a and 100b may both be supported from a common bridge structure 104, with another bridge element 105 provided to support both the divider rods 101a and 101b.

In practical operation, all the conveyor belts move continuously in clockwise direction, as viewed in Fig. 2A, with their upper surfaces advancing at uniform speed toward the casing unit B of the machine, as indicated by the arrows in Figs. 1A and 3. The containers are received at the feed end of the conveyor arrangement in a single file line and are delivered into the first gate 55 formed by the rotors 56 and 56'. As long as there is no container directly in front of said gate, the key 82 maintains the rotors 56 and 56' rigidly in their proper container receiving positions, such as illustrated in Figs. 6 and 8. As soon as a container moves under the spring finger 89, the lock key 82 is withdrawn from whatever notch 81 of the collar 80 it engaged, and releases the rotors so that they may turn under the force of the advancing container. As a result thereof, the deflector surface first contacted by the container smoothly swings said container sideways into a nook of the opposite rotor which guides it through the gateway to the discharge end thereof, from where said container continues to advance along a linear path somewhat to the right or the left of its original path, as the case may be (Fig. 11). When the operative segments of the rotors 56, 56' have reached a position wherein they release said container for continued rectilinear movement with and upon the conveyor belt 30, their diametrically opposite segments are in proper position to admit another container; and unless a new container has meanwhile arrived and has moved under the spring finger 89, the rotors 56 and 56' are locked in this position by the return of the key 82 into one of the notches 81 in the collar 80. However, if another container has meanwhile arrived, the rotors 56, 56' repeat the described container shifting operations in a symmetrically opposite manner, releasing said second container for advance along a rectilinear path that is laterally offset from its original path in a direction opposite to that of said first container. Hence, for proper operation, the described container shifting mechanism does not require special apparatus to deliver successive containers in timed relation into its range of operation, but acts as its own timing mechanism, and thus is capable of properly dividing container supply lines, whether the consecutive containers arrive in abutting relation or are spaced varying distances apart. The containers emerging from the described shifting gate 55 in the partially divide double-line formation, illustrated in Fig. 11, encounter the centrally positioned divider rod 90 which completes the separation into two distinctly separate files.

Due to the fact that the described formation of a double-file container line from a single-file supply line occurs in two sequential steps, as above described, the division of the original file involves no severe shocks but occurs smoothly and gradually and may, therefore, be carried out at far greater speeds than previously possible, without danger of harming the containers or jamming the dividing mechanism. The arrangement of the invention is therefore of particular advantage in handling containers of a fragile nature, such as glass or paper containers. Furthermore, while in the particular embodiment of the invention illustrated in the accompanying drawings, the described high speed non-shock division of a container supply line is repeated but once for each of the newly formed files, it will be understood that the division process of the invention may be repeated in a greater or lesser number, so that a container supply line may be divided, not only into 2 or 4, but into 3, 5, 6, 7 and 8 and, in fact, any desired number of rows, by providing an appropriate number of the described line-dividing arrangements and by appropriately increasing the number of conveyor belts with each additional line-division.

The case-loading unit B (Figs. 1B, 2B and 14) comprises a pair of vertical side frames 121 and 122 bolted in spaced parallel relation to a common pedestal 123 with their upper ends held rigidly in their proper position relative to one another by a horizontal spacer rod 124. Journalled in the center of said side frames at about the level of the container supply lanes is a horizontally disposed shaft 125 and keyed to said shaft, interiorly of and adjacent to said side frames, are two spiders 131 and 132 (Figs. 12 and 13) each comprising three radially extending arms 131a, 131b, 131c and 132a, 132b, 132c, (Figs. 20 to 23 incl.) which are angularly disposed relative to each other and the ends of which are bored to freely receive three transverse rods 133a, 133b and 133c, respectively. Pinned to each of said rods are four lifting levers or transfer arms 134, one for each of the four terminal lanes of the container supply line, and each of said lifting levers is composed of a lifting finger 135 and a retaining thumb 136. Firmly secured to the right hand ends of the transverse rods 133 are bell crank levers 140, the ends of which are provided with cam follower rollers 141 and 142. The rollers 141 are arranged to engage the edge of a stationary cam 143 which is fitted over the shaft 125 and bolted to the inner face of the right hand side frame 122. Supported from said cam 143 by a number of metal braces is a retaining strip 144 (Fig. 24) which accompanies the top sector of the cam 143 to maintain the rollers 141 in contact with the edge of said cam over part of the rotary travel of the rods 133 about the center axis of the machine. The rollers 142 at the opposite ends of the bell cranks 140 are arranged to engage a camway 145 (Figs. 2B, 12, 13, 14 and 24) that is likewise bolted to the inner face of the side frame 122 and which extends along the forward edge and part of the bottom edge of cam 143. As rotation of the machine shaft 125 swings the carrier rods 133 in circular orbits about the center axis of the machine, the configuration of cam 143 and camway 145 controls the angular position of said rods and thus determines the angular position of the transfer levers 134 pinned to said rods in a manner to be described in greater detail hereinafter.

For the containers to be properly delivered from the supply conveyor onto the lifting fingers 135, the four supply lanes formed by the partitioning plates 42a, 42b, 42c, 42d, and 42e are extended beyond the forward ends of the conveyor belts 31, 32 and 33 by five vertically positioned partitioning plates 150 (Figs. 1B and 14) which intervene between the circular paths of the transfer arms 134 (Fig. 12). Said partitioning plates are supported from, and maintained in properly spaced position by, four base blocks 151 which are bolted to the pedestal 123 of the casing machine B. Angle bars 152 and 153 are secured to the confronting surfaces of each two of said partitioning plates 150 (Fig. 13) at such a level that their horizontal flanges 152a and 153a form a continuation of the upper conveyor belt surfaces (Fig. 16). Said horizontal flanges 152a and 153a are sufficiently spaced apart to permit the transfer arms 134 to pass intermediately thereof; they form the ramps upon which the arriving containers slide into position above said lifting fingers 135.

To prevent entanglement of the container rims with the rearwardly directed edges 152' and 153' of the ramps 152a, 153a (Fig. 16) as the containers arrive at and are passed over onto said ramps, special transfer bridges 155a, 155b and 155c (Figs. 14 and 16) are interposed between the forward ends of each of the conveyor belts and the rearwardly directed ends of the ramps. Said transfer bridges are formed by horizontal plates which are supported upon suitable lugs or ears 156 projecting laterally from the partitioning plates 150, at about the same level as said belts and ramps, respectively. Said bridges are provided with rearwardly directed tongues or tails 157, each extending laterally of one of the conveyor belts at the level of its upper surface with its free end curved downwardly below said level, as shown at 158 in Fig. 16. Thus, containers carried along upon the upper surfaces of the belts glide smoothly over and upon the downwardly curved ends of the tails which lift them to the level of the bridges 155, so that they may pass smoothly over the rear edges of said bridges, from where succeeding containers push them onto the container receiving ramps without any possibility of obstruction or entanglement.

At a level somewhat above the culmination point of the transfer lever supporting rods 133 (Figs. 2B, 13 and 15) the side frames 121, 122 form forwardly projecting brackets or consoles 161 and 162, respectively, upon which is rigidly supported a board or shelf 163 which carries the case-loading chute 165. The floor of said chute (Figs. 1B and 13) is formed by three longitudinally extending angle bars 166 supported upon the shelf 163 in spaced parallel relation with their corners pointing upwardly, to form with the side walls of the chute, four parallel channels corresponding to the four terminal lanes of the container supply line. Said channels are effective to maintain containers successively delivered onto the loading chute in proper longitudinal alignment.

The side walls of the chute 165 are formed by a pair of metal sheets 167 and 168 which are hingedly supported from the side frames 121 and 122, respectively, with their discharge ends resiliently urged in inward direction to maintain transversely adjacent containers in lateral contact with one another and thus insure smooth discharge of container tiers into whatever case or carton may be slid over the end of the loading chute 165. For this purpose, brackets 170 are bolted to the outer surfaces of each of the chute walls 167 and 168 near the container receiving ends thereof, and each of said brackets is provided with a pair of vertically superposed bored bosses 171 and 172, that turn in vertical rods 173 which are rigidly supported from the side frames 121 and 122, respectively, as best shown in Fig. 13. A pair of set collars 174 and 175 are pinned to said rods adjacent to, and inwardly of, said bosses to retain the side walls of the chute in their proper vertical positions. Interposed between the outer faces of the chute walls and the inner faces of the side frames at points forwardly of the described hinge connections are compression spring 176 which are coiled around studs 177 that project outwardly from said chute walls or their brackets 170 and extend through suitable apertures in the side frames 121 or 122, respectively. The outwardly protruding ends of said studs are threaded to receive setting nuts 178 which provide means for adjusting the extent to which the rear ends of the chute walls 167, 168 may approach one another under the urge of the springs 176.

The machine comprises means for pushing tiers of containers deposited in the described loading chute by the lifting fingers 135 forwardly out of said chute. For this purpose, a pair of elongated actuating arms 191 and 192 are pivoted to the outer faces of the side frames 121 and 122, near the lower ends thereof and extend with their upper ends above said side frames, as illustrated in Figs. 2B, 12 and 13. Said upper ends are slotted, as shown at 193, to freely receive a transverse horizontal shaft 194 which supports the upper ends of a pair of rocker plates 195 and 196 (Figs. 15 and 25) that have somewhat the shape of anchors. The crowns of said anchors are firmly attached to another horizontal shaft 197 that is journalled in a pair of arches 198 and 199 which rise from the top surface of a horizontal plate 200. Said plate (Figs. 12, 13 and 15) is arranged to slide within a pair of horizontal guide grooves 201 and 202 that are formed between inwardly directed horizontal ledges 203 and 203' provided along the upper ends of the side frames 121 and 122, respectively, and suitable cover strips 204 and 204' supported from said side frames an appropriate distance above said ledges. Firmly mounted upon the shaft 197 is a pair of parallel loading shoes 205 and 206, each having a flat forwardly directed pusher surface 207, as shown in Figs. 2B, 13 and 20. Said loading shoes are preferably provided with split hubs 208 (Figs. 1B and 12) which embrace the shaft 197 and are clamped tightly upon said shaft by set screws 209, that may be loosened to permit adjustment of the angular position of the shoes upon said shaft 197.

During operation of the machine, the angular position of the loading shoes and hence the location of their pusher surfaces in or above the loading chute is determined by the rotary position of the shaft 197 which, in turn, is controlled by the position of the anchor-shaped rocker plates 195 and 196 since the ends of said shaft 197 are firmly mounted in the crowns of said anchor-shaped plates as previously described. The bottom edges of the rearward and forward arms 211 and 212 of said anchors 195, 196 (Fig. 25) form angularly inclined surfaces 213 and 214, respectively, which merge over a recessed rounded surface 215 at the crown of the anchor. Either of said surfaces 213, 214 may be in contact with the upper surface of the slide 200 depending on whether the actuating arms 191, 192 move the rocker plates in a forward or rearward direction; and depending on whether the rearward surfaces 213 or the forward surfaces 214 are in contact with said slide 200, the pusher faces 207 of the loading shoes will either be lifted out of and above the loading chute (Figs. 20 and 23) or will be dipped down to the bottom of said chute (Figs. 21 and 22).

The machine comprises means for alternately swinging the actuator arms 191, 192 in forward and rearward direction to push the loading shoes in lowered condition forwardly through the loading chute and thereafter return said shoes to their initial position rearwardly of said chute, with their pusher surfaces lifted above said chute and any containers that may have been deposited thereinto during the forward movement of said pusher surfaces. For this purpose, the actuator arms 191 and 192 (Figs. 2B and 12) are each provided with rearwardly directed extensions or tails 215 and 216, which are pivotally connected to links 217 and 218, respectively, that in turn are pivoted to a pair of crank discs 219 and 220, respectively, and both said crank discs are firmly mounted upon a common actuator shaft 221 that may be suitably journalled in the previously described base blocks 151. With every revolution of said shaft, the discs 219, 220 move the actuator arms 191, 192 in unison from the rearward position, illustrated in Fig. 20, to the forward position, illustrated in Fig. 22, and back to the initially occupied rearmost position in a manner to be described in greater detail hereinafter.

The container supply line A and the case-loading mechanism B are both driven from a common motor 250 (Fig. 2B), but while a sprocket chain 251 applies the power of the motor directly to the conveyor belts of the container supply line and keeps said belts in continuous motion as long as the motor operates, the operation of the case-loading mechanism is controlled by a program clutch 252 (Fig. 15), the drive or input end of which is operatively connected with the power shaft of the motor 250 through a suitable belt 253 (Figs. 2B and 15). A sprocket chain 254 operatively connects a sprocket 255 mounted upon the driven end of the program clutch 252 with a sprocket 256 keyed upon the main shaft 125 of the case loading machine and also with a sprocket 257 which is firmly mounted upon the previously described crank shaft 221. Thus, the program clutch 252 is arranged to control operation of both the container transfer levers or arms 134 and the loading shoes 205, 206.

The program clutch 252 is a single revolution clutch of suitable design and is normally held out of engagement by a clutch dog 260 (Figs. 2B and 15) so that the machine is ordinarily at a standstill, even though the container supply mechanism may be in continuous motion, but a solenoid 261 is arranged to temporarily withdraw said dog from the clutch, and thus permit its driven end to perform a single revolution, whenever the power circuit of said solenoid is closed. For this purpose, the plunger 262 of the solenoid 261 is pivoted to one end of a bell crank 263, the opposite end of which is connected with the clutch dog 260 that is normally urged into clutch-disabling position by a restore spring 264 (Fig. 15).

The power circuit of the solenoid 261 is illustrated in Fig. 18; it includes three types of switches which are normally open; the two switches identified by the reference numerals 270 and 271 are contact switches which are arranged to close only if and when the container receiving table of the casing machine as formed by the horizontal flanges of the angle irons 152 and 153 is loaded with containers to capacity. To this end, the switches 270 and 271 (Fig. 14) are supported from the forward ends of the second and fourth partitioning plates 150, and each of said switches possesses a pair of parallel actuator slides 272 and 273 (Fig. 19) extending at either side of their respective partitioning plate 150 over the forward edges of the horizontal angle-bar flanges 152a and 153a which form part of two adjacent container receiving ramps (Figs. 14 and 19). Said slides 272, 273 are arranged to move in suitable guide grooves 274 and 275, respectively, provided in the side walls of the switch casing 276, and interiorly of said casing, said slides are connected by a transverse bar 277. The center of said bar is arranged to bear against the rearwardly protruding push button 278 of a micro-switch 279 of conventional design which is located in the forward end of the switch casing 276, as indicated in dotted lines in Fig. 19.

Whenever the two ramps at either side of the second or fourth partitioning plate 150 are filled with containers, the foremost containers press against the protruding ends of the slides 272 and 273 and in this manner force the transverse bar 277 against the push button 278, which closes the switch 279. However, if only one of the two ramps is filled with containers, only one of the slides 272 or 273 is pushed which causes the transverse bar 277 to rock ineffectively upon the push button 278 without operating the switch 279, until an equal pressure is applied to the other slide indicating that the other ramp has likewise been filled with containers. Only then will the push button 278 be actuated to close the switch 279. Thus, by providing two switches of the type described, at the ends of the second and fourth partitioning plates 150, as shown in Fig. 14, the power circuit for the clutch-dog-operating solenoid 261 (Fig. 18) can only be actuated if all the four container receiving ramps of the case-loading machine are filled to capacity with containers. The guide grooves 274 and 275 are of sufficient width to permit the above described rocking movement of the transverse bar 277.

The power circuit of the clutch control solenoid 261 contains also a manually operable control switch 280 which may take the form of a foot pedal switch as shown in Figs. 2B and 14. Said switch may be closed by attending personnel and is effective to energize the solenoid 261 provided the previously described switches 270 and 271 in the container-receiving station of the machine are closed by the presence of the proper number of containers on the receiving ramps. In addition, the power circuit of the clutch control solenoid contains a switch 282 which is shunted across the foot pedal switch 280 and is adapted to close the power circuit disregarding the operative position of said foot pedal switch. The condition of the shunt switch 282 is controlled by a rotary cam 283 in the shape of a mutilated circular disc that is mounted upon the crank shaft 221. With said crank shaft in its position of rest corresponding to the most rearward position of the loading shoes, the operating arm 284 of the shunt switch 282 rides upon the circular contour 283a of the control cam 283, as shown in Fig. 20, which is arranged to keep the switch 282 in open condition. However, after the case-loading unit has commenced to operate and the crank shaft 221 has performed somewhat less than half a revolution, the operating arm 284 drops into the mutilated segment 283b of the control cam which is arranged to close the shunt switch. As a result thereof, the power circuit of the clutch-controlling solenoid 261 is energized and the machine will continue to operate disregarding the position of the foot pedal switch 280. As the machine continues to operate, however, the control arm 284 of the shunt switch 282 is forced to climb back upon the circular swell 283a of the control cam 283 at the opposite end of the mutilated cam segment, and thus interrupts the power supply to the clutch-controlling solenoid 261, causing the machine to come to a standstill after the driven side of the clutch has completed its current revolution.

Describing now the cycle of operation of the casing machine, let it be assumed that the machine is at a standstill and that the previously described conveyor mechanism has completely filled the four container receiving ramps of the machine so that the switches 270 and 271 at the inner ends of said ramps are closed. Whenever the machine of the invention is at rest, one set of transfer fingers 135a is disposed intermediately of the horizontal angle bar flanges 152a, 153a that form the container receiving ramps. The succeeding set of transfer fingers 135b is in an idle position 120° behind the transfer fingers 135a, as illustrated in Fig. 20, and the third set 135c is positioned at the rear of the loading chute 165 where it may have deposited a tier of containers during the directly preceding cycle of the machine operation. The loading-shoe actuator arms 191, 192 are in their extreme rearward position, as likewise illustrated in Fig. 20, with the rearward arms 211 of the anchor-shaped rocker plates 195, 196 in contact with the slide 200 and the loading shoes 205, 206 raised above the loading chute 165. To start operation of the machine, the operator depresses the foot pedal switch 280 momentarily which is effective to energize the solenoid 261 since the contact switches 270 and 271 are closed by the presence of the proper number of containers on the receiving ramps, as previously indicated. The energized solenoid lifts the plunger 262 and thus withdraws the clutch dog 260 from the clutch 252 enabling the driven end of said clutch to make one complete revolution in clockwise direction, as viewed in Fig. 15. Rotation of the sprocket 255 on the driven side of the clutch 252 in clockwise direction causes both the main shaft sprocket 256 and the crank shaft sprocket 257 to turn in clockwise direction, the transmission rate of said sprockets being so proportioned that for every complete revolution of the clutch sprocket 255 the main shaft sprocket 256 performs one-third of a revolution, while the crank-shaft sprocket 257 performs one-half of a revolution. As the crank discs 219, 220, mounted upon the crank shaft 221, revolve over an arc of 180°, the links 217 and 218 push the actuator arms 191, 192 from the extreme rearward position shown in Fig. 20 to the extreme forward position illustrated in Fig. 22. As the upper ends of said actuator arms begin to swing in forward direction, forward movement of the transverse shaft 194 rocks the anchor-shaped plates 195, 196 from the rearwardly inclined position illustrated in Fig. 20, in which their rearward arms 211 are in contact with the upper surface of the slide 200 and the loading shoes 205, 206 are raised above the level of the loading chute 165, into a forwardly inclined position, in which the forward arms 212 of said plates are in contact with the slide 200 and the loading shoes are dipped into the loading chute at the rear end thereof, as shown in Fig. 21. As the upper ends of the actuator arms 191, 192 continue to swing forwardly under the force of the rotating discs 219, 220, they push the slide 200 forwardly within the previously described horizontal guide grooves 201, 202 causing the loading shoes to move in lower position through the loading chute from the rear end to the discharge end thereof, so that their pusher surfaces 207 will sweep any containers, that may have been present, forwardly out of said chute.

While rotation of the crank discs 219, 220 over an arc of 180° actuates the loading shoes in the manner described above, the main operating shaft 125 turns over an arc of only 120° causing the lifting fingers 135a to be moved from the position shown in Fig. 20, where they extend horizontally and intermediately of the container receiving ramps of the machine to the position illustrated in Fig. 22, where they extend vertically through the spaces between the floor bars 166 of the loading chute 165 at the rear end thereof. In this manner the lifting fingers 135a transfer a full tier of containers from the receiving table of the machine onto the loading chute. During the described transfer movement the roller 141a on one end of the bell crank lever 140a and the circular rearwardly directed sector 143a of the stationary control cam 143 cooperate to adjust the fingers 135a continually to a position radially of the main operating shaft 125, in order that the change in the position of the containers from an upright to a lying down condition may occur gradually. During the initial phase of the described transfer movement, when the fingers 135a lift the weight of a full tier of containers, said weight maintains the roller 141a in contact with the cam 143; but over the final phase of said transfer movement, when the container tier approaches horizontal position and begins to bear against the retaining thumbs 136a of the transfer levers 134a, the previously described guide strip 144 positively maintains the roller 141a in contact with the control cam 143 until the container tier has been deposited into, and pushed a limited distance forwardly within, the loading chute.

To keep the containers together as they are transferred in the described manner, stationary side walls or guide surfaces 291 and 292 may be provided which extend from the receiving table to the rear end of the loading chute, as shown in Figs. 2B and 12. Furthermore, since containers resting upon the outer ends of the transfer fingers may not be fully supported and may therefore tilt backwardly and drop from said fingers as the fingers begin to rise above the receiving ramps and their ends contact the recessed interior of the container bottom instead of the container rims, the transfer fingers may be slightly bent upwardly at their outer extremities, as indicated at 295 in Fig. 27. In this manner, improperly positioned containers are maintained in horizontal position, as the transfer fingers begin to rise, and the danger that the containers may drop from the transfer fingers is therefore materially reduced. In addition, the case loading machine may comprise means effective to prevent newly arriving containers from reaching the container receiving ramps as soon as the machine commences operation and lifts the transfer fingers 135 above said receiving ramps, in order to avoid that such newly arriving containers be caught by the ends of the rising transfer fingers and thrown backwards into the container lanes, where they may cause complete disorganization of the container supply. For this purpose, a bell crank 300 may be pivoted to the left hand side frame 121 at approximately the level of the receiving ramps, as shown in Figs. 15 and 16. One arm of said bell crank forms an inwardly directed camming edge 301 while its other arm 302 is pivotally connected to one end of a rearwardly extending link 303. The opposite end of said link is pivoted to an arm 304 that is firmly mounted upon a transverse shaft 305 which extends through, and is suitably journalled in, the previously described vertical partitioning plates 150 at a point directly behind the rear edges of the container receiving ramps (Fig. 16). Firmly mounted upon said transverse shaft at either side of each of the transfer bridges 155 are stops 306. A spring 307 tensioned between the link 303 and a stationary point 308 of the leftmost partitioning plate 150a maintains the described train of levers in a position in which the stops 306 lie flat below the level of the transfer bridges 155 and the camming edge 301 of the bell crank 300 is drawn into the circular orbit of rollers 309 pivoted to the left hand ends of the transfer lever supporting rods 133, as illustrated in dotted lines in Fig. 15. Whenever the machine commences operation and the rod 133 of the particular set of transfer fingers disposed intermediately of the receiving ramps begins to rise, the roller 309 pivoted to the left hand end of said rod engages the camming edge 301 of the bell crank 300 and forces said bell crank to yield in rearward direction. This causes the shaft 305 to turn in counterclockwise direction and swings the stops 306 into upright position pushing backwards any containers that may crowd upon the filled receiving ramps. Thus, the ends of the transfer fingers are cleared and a space is created between the containers on said fingers and the containers in the terminal lanes of the supply line so that the transfer fingers may freely rise without any entanglement whatsoever. After the roller 309 has negotiated the camming edge 301 of the bell crank 300, the spring 307 restores the stops 306 to their initial position in which they are submerged below the level of the transfer bridges 155 so that newly arriving containers may now freely slide onto the container receiving ramps. To permit continued operation of the container supply line, as further flow of containers onto the receiving ramps is blocked in the above described manner by the stops 306, or by short interruptions in the operation of the case-loading unit, the terminal lanes 102a, 102b, 103a and 103b of the supply line are exceptionally long, as best shown in Fig. 1A, to provide space in which newly arriving containers may accumulate until another tier is withdrawn by the case-loading machine.

With the first revolution of the clutch sprocket 255 completed and the loading shoes 205, 206 in forward position while the transfer fingers 135a are disposed vertically behind the loading chute 165, as illustrated in Fig 22, the control circuit is automatically conditioned to withdraw the clutch dog 260 from the clutch 252 to initiate another full revolution of the clutch sprocket 255 without requiring actuation of the foot pedal switch 280; for the crank shaft 221, having performed one-half of a revolution, has placed the control cam 283 of the shunt switch 282 into the position illustrated in Fig. 22 in which it closes said shunt switch so that the clutch releasing solenoid 261 is energized disregarding the position of the foot pedal switch 280, provided the contact switches 270, 271 at the inner end of the container receiving ramps are closed by the presence of an adequate number of newly arrived containers.

As the clutch sprocket 255 performs its second revolution, the crank discs 219, 220 are again turned over an arc of 180°, and pull the links 217 and 218 and the actuator arms 191 and 192 back into their original positions. As the upper ends of said actuator arms begin to swing backwards, they first rock the anchor-like plates 195, 196 backwards with their rear arms 211 into contact with the slide 200 so that the loading shoes 205, 206 are lifted out of the loading chute and above the tier of containers deposited therein by the previously described phase in the operation of the machine, as shown in Fig. 23. To facilitate said rearward rocking of the plates 195, 196 against the weight of the forwardly extending loading shoes, a rearwardly extending arm 310 is firmly mounted upon the transverse shaft 197 to which the loading shoes are secured, and mounted upon the end of said arm is a suitable counterweight 311 (Figs. 2B, 12 and 15). As the rearward movement of the actuator bars 191, 192 continues with the rearward arms 211 of the rocker plates 195, 196, in contact with the slide 200, said slide is shifted rearwardly within its horizontal guide grooves 201, 202 causing the loading shoes to swing rearwardly above the containers in the loading chute until said loading shoes resume the initial position illustrated in Fig. 20.

As the above described operation occurs, the main shaft 125 of the machine turns over another angle of 120°. During this movement the roller 141a of the bell crank 140a pivoted to the transfer lever supporting bar 133a idles along a mutilated sector 143b of the stationary cam 143, but the roller 142a pivoted to the opposite end of said bell crank moves into and is guided by the previously described camway 145. The initial sector of said camway is of a conformation to maintain the transfer fingers 135a in a substantially vertical position as they slide forwardly within the spaces between the side walls and the floor bars of the loading chute while dropping away from said chute. In this manner the previously deposited tier of containers is pushed a limited distance forwardly within said chute to provide space rearwardly of said first tier for another tier of containers to enter said chute. As the transfer fingers 135a act in the described manner, the next set of transfer fingers 135b rises from the receiving ramps and lifts another container tier onto the loading chute 165 in a manner identical with the previously explained transfer operation of the fingers 135a; and as the transfer fingers 135b move the second tier of containers into the loading chute, the first tier is pushed forwardly by said second tier until said second tier reaches the position which the first tier occupied at the end of the first revolution of the control clutch 252.

Thus, as the loading shoes rise out of the chute 165 and move back to their initial position above and rearwardly of said chute, the machine deposits a second tier of containers into the chute underneath the returning loading shoes so that while the chute is charged with the proper number of container tiers, the loading shoes are conditioned for renewed operation.

While the transfer fingers 135a drop away from the loading chute and the transfer fingers 135b deposit another tier of containers into said chute, the carrier bar 133c which supports the third set of transfer levers 134c swings from a position in the lower quadrant of its circular orbit (Fig. 22) into a position directly in front of the receiving ramps of the machine (Fig. 23) with the cam 143 and the camway 145 successively determining the angular position of its transfer fingers 135c. The respective sectors of said cam and camway are of such conformation that the lifting fingers 135c will ultimately assume positions intermediately of and in horizontal alignment with the angle-bar flanges 152a, 153a which form the receiving table of the loading machine.

After the clutch sprocket 255 has performed its second revolution and effected the above described operations, the machine comes to a halt because rotation of the crank shaft 221 through a second arc of 180° has returned the switch control cam 283 to its initial position in which it keeps the shunt switch 282 open. Thus, unless the foot pedal switch 280 is again depressed, the solenoid 261 remains inactive, even though a sufficient number of new containers may have arrived on the receiving ramps to close the contact switches 270 and 271. Hence, the machine is at a standstill with two tiers of containers in the loading chute 165. The operator may now slip the open end of a case or crate over the converging discharge end of the loading chute and depress the foot pedal switch 280 anew. Provided the proper number of containers has meanwhile assembled on the receiving ramps of the machine, the depression of the foot pedal switch 280 initiates another two-revolution cycle of the program clutch 252, during which the loading shoes will first drop behind the two tiers of containers in the loading chute and then move forward through said chute to push said tiers into the case and eject both case and containers onto a suitable conveyor (not shown), while the transfer fingers 135c lift a third tier of containers from the receiving table onto the loading chute rearwardly of the advancing loading shoes; and as the program clutch performs a second revolution, the loading shoes rise again above the loading chute and return to their original position, while the transfer fingers 135a deposit a fourth tier of containers into said loading chute, whereupon the machine comes again to a standstill, and the operator must again depress the foot pedal switch to eject the two container tiers from the loading chute and place two additional tiers into said chute.

While I have explained my invention with the aid of special embodiments thereof, it will be understood that I do not wish to be limited to the particular constructional details shown and described which may be departed from without departing from the spirit and scope of my invention. Thus, the machine may possess more than three sets of transfer fingers and each set may encompass a smaller or greater number of fingers than that specifically illustrated. Also, the operation of the tiering fingers and the loading shoes may be correlated to deliver more than two tiers of containers into a case. Thus, the arrangement may be such that the transfer fingers and the loading shoes are operated from separate clutches, with the clutch of the latter being automatically engaged to effect a forward and return stroke of the loading shoes, whenever a predetermined number of containers tiers has been placed into the loading chute. Moreover, while I have disclosed a particularly advantageous container supply mechanism which will divide an approaching single-file container line at maximum speed and with minimum shock into any number of parallel files, such as may be required to properly supply a particular case-loading unit of the type described, other container supply mechanisms may be employed in connection with the casing machine of my invention, such as for instance the arrangement illustrated in Fig. 26. In said figure, the reference numeral 320 represent diagrammatically five container receiving ramps of a casing machine constructed in accordance with my invention. Said ramps are formed between six partitioning walls 321, and extending transversely across the open ends of said ramps is a runway 322 that forms the end of a suitable container supply line 323. The outer flank of the runway 322 is formed by a pusher head in the form of a vertical plate 324 which is mounted upon the forward ends of two plungers 325 and 326. Said plungers form part of a container injector mechanism that is adapted to reciprocate said pusher across the runway 322. Ordinarily, said pusher plate is held sufficiently far withdrawn from the rear ends of the ramp walls 321 to permit containers arriving on the supply line 323 to push one another forwardly along the runway 322 until the foremost container strikes against a buffer 327 disposed at the end of said runway substantially in line with the outer wall of the leftmost container receiving ramp. Said buffer 327 is part of the operating arm 328 of a contact switch 329, and when said buffer is pushed backwards, which indicates that the required number of containers has assembled upon said runway and is properly lined up before said ramps, said switch is closed and activates the injector mechanism for a single forward thrust which pushes the assembled containers onto their respective ramps, whereupon the pusher plate 324 returns to its initial position to permit another row of containers to assemble upon the runway 322. As containers continue to slide into the runway 322 and press against the buffer 327, row after row of containers is pushed sideways onto the ramps 320 until the foremost containers on the ramps contact the previously described control switches at the forward ends of said ramps, and thus condition the case-loading machine for a transfer operation.

Having thus described my invention, what I claim as new is:

1. A mechanism adapted to transform a single file container line advancing upon conveying means along a rectilinear path into a partially separated double file line comprising a pair of rotors mounted at either side of said path in spaced parallel relation to form a gate, said rotors having container deflecting elements and container receiving elements in alternate succession along their circumference, means mechanically coupling said rotors for unitary movement in opposite directions at a phase difference adapted to continually oppose deflecting elements with receiving elements within said gate, means arranged to lock said rotors in relative positions adapted to admit a container into said gate and means operable incident to the presence of a container at the entrance side of said gate to disable said locking means.

2. A mechanism for dividing a procession of containers, comprising means for conveying containers in upright position along a rectilinear path, a pair of rotors mounted at either side of said path in spaced parallel relation to form a gate, the side walls of said rotors being arranged to form a pair of diametrically opposite convex deflector surfaces and a pair of diametrically opposite concave receiving nooks, means coupling said rotors for synchronized movement in opposite directions at a phase difference of 90°, means arranged to lock said rotors against rotation whenever they are in a relative position adapted to admit a container into said gate, and means responsive to the presence of a container at the entrance side of said gate to temporarily disable said locking means.

3. A mechanism for dividing a container procession; comprising a pair of horizontally spaced vertical shafts; a horizontal shaft arranged to operatively couple said vertical shafts for unitary rotation in opposite directions; rotors firmly mounted upon said parallel shafts, said rotors having side walls of variable radial distance from their respective shafts arranged to provide a number of relative positions adapted to admit a container into the space therebetween; a collar firmly mounted upon said horizontal shaft, a bell crank lever pivotally mounted in front and intermediately of said rotors, a key secured to one arm of said bell crank lever, a number of means for engaging said key provided on said collar at points corresponding to said container receiving rotor positions, and yieldable means for urging said key against said collar while projecting the other arm of said bell crank into the space before said rotors.

4. A mechanism for dividing a container procession, comprising a pair of horizontally spaced vertical shafts; rotors firmly mounted upon said shafts, each of said rotors forming a circumferentially alternating sequence of container deflecting and container receiving elements; a horizontal shaft arranged to operatively couple said vertical shafts for unitary rotation in opposite directions, said rotors being mounted upon said vertical shafts at an angular difference adapted to continually oppose container deflecting elements with container receiving elements at the narrowest point of the rotor orbits but providing with each revolution a plurality of relative positions of said rotors adapted to admit a container into the space therebetween; a collar firmly mounted upon said horizontal shaft, said collar having a plurality of circumferentially equi-spaced notches corresponding to said container admitting rotor positions; a pivotally mounted bell crank having an upper and a lower arm; a key carried by said upper arm, said key being adapted to engage any one of said notches; a spring finger supported from said lower arm; and yieldable means urging said bell crank into a position wherein said key presses against said collar while said spring finger is projected into the space before said rotors.

5. A case loading arrangement comprising in combination means for dividing a procession of containers into a plurality of parallel adjacent files, a case loading chute disposed beyond the end of said files and adapted to receive a number of the containers, cyclically operable transfer means arranged to transfer simultaneously a predetermined number of containers from each of said files along a circular path into said chute, and means operating in timed relation with said transfer means for ejecting containers from said case-loading chute into a case.

6. A case loading arrangement comprising in combination a plurality of parallel and adjacent container supply lanes, a case loading chute disposed beyond the forward end of said lanes and adapted to receive a number of containers, cyclically operable transfer means arranged to transfer a predetermined number of containers from each of said lanes along a circular path into said chute, and means operating in timed relation with said transfer means for forwardly ejecting containers from said case-loading chute into a case.

7. A case loading arrangement comprising in combination a plurality of parallel and adjacent container supply lanes, a case loading chute disposed beyond the end of said lanes and adapted to receive and pass a number of containers into a case, cyclically operable means arranged to transfer a predetermined number of containers from each of said lanes along a circular path into said chute, and means associated with said lanes for rendering said transfer means ineffective until said predetermined number of containers has assembled in said supply lanes.

8. A case loading arrangement comprising in combination means for dividing a procession of upright containers into a plurality of parallel adjacent files, a chute corresponding in width to said adjacent container files disposed beyond the forward ends thereof, uni-directionally revolving transfer means comprising a plurality of ganged parallel transfer arms, one for each of said files and each arranged to engage with every revolution a preestablished number of upright containers in said files from below and deposit them in superposed lying-down condition into said chute.

9. A case loading arrangement comprising in combination a plurality of parallel adjacent container supply lanes adapted to accommodate containers in upright condition, a chute corresponding in width to said adjacent container lanes disposed beyond the forward ends thereof, uni-directionally revolving transfer means comprising a plurality of ganged parallel transfer arms, one for each of said files, and each adapted to engage with every revolution a pre-established number of upright containers in said lanes from below and deposit them in lying-down condition into said chute to form a tier of superposed containers, and means operable in timed relation with said transfer means for pushing a predetermined number of said tiers forwardly out of said chute.

10. Arrangement according to claim 9 comprising means disposed at the forward ends of said supply lanes for rendering said transfer means ineffective until said pre-established number of containers has assembled in each of said lanes.

11. Arrangement for indicating the presence of a full number of containers upon a pair of adjacent container receiving ramps, comprising a switch mounted intermediately of said ramps at the forward end thereof, and having a rearwardly directed actuator element, a transverse bar arranged to bear centrally against said actuator element, and parallel actuator arms engaging the opposite ends of said transverse bar and extending over the forward edges of said receiving ramps.

12. A case loading machine comprising a multi-lane container receiving station, a case loading chute and a container transfer mechanism adapted to transfer containers from said receiving station into said chute, said transfer mechanism comprising a plurality of horizontal carrier rods arranged in equi-spaced relation about a common horizontal axis, a set of transfer fingers mounted in angular alignment upon each of said rods, means for rotating said rods in unison about said center axis in a direction from said container receiving station to said loading chute, and means controlling the angular position of said transfer fingers during rotation of said rods about said center axis.

13. A case loading machine for transferring containers from a supply line in superposed tiers into a case, crate or the like, including a multi-ramp container receiving station; a case loading chute and a container transfer mechanism adapted to simultaneously transfer a predetermined number of containers from each of the ramps of said receiving station into said chute, said transfer mechanism comprising a plurality of horizontal carrier rods arranged in equi-spaced relation about a common horizontal axis, a set of transfer fingers, one for each of said ramps, pinned in angular alignment to each of said rods, means for rotating said rods in unison about said center axis, and means controlling the angular position of said transfer fingers during rotation of said rods about said center axis.

14. Machine according to claim 13 wherein said container receiving ramps are formed by transversely spaced horizontal bars disposed at either side of the circular orbits of said transfer fingers at the level of the container supply line, and wherein said transfer finger control means is arranged to adjust said fingers to horizontal position as they pass intermediately of said bars.

15. Machine according to claim 13 wherein the floor of said case loading chute is formed by a plurality of bars spaced transversely from one another to permit said transfer fingers to pass intermediately thereof, and wherein said transfer finger control means is arranged to adjust said fingers to a substantially vertical position as they pass through said chute.

16. In a case loading machine having a multilane container receiving station adapted to receive containers in upright condition and a case loading chute spaced from said container receiving station; a container transfer mechanism adapted to simultaneously lift a predetermined number of upright containers from each of the lanes of said receiving station and deposit them in superposed lying-down condition into said chute, comprising a horizontally disposed main operating shaft; a plurality of auxiliary shafts supported from and arranged in equi-spaced relation about said main operating shaft, said auxiliary shafts being rotatable about their individual center axes; a set of container transfer arms, one for each of the lanes of said receiving station, pinned in angular alignment to each of said auxiliary shafts; cyclically operable means for turning said main shaft; and means for controlling the angular position of said transfer arms during rotation of said main shaft, including levers rigidly connected to the ends of said auxiliary shafts and stationary cam means adapted to engage rollers pivoted to said levers.

17. A transfer mechanism according to claim 16, wherein each of said transfer arms is composed of a lifting finger and a retaining thumb extending substantially at right angles to said finger.

18. A transfer arm for container transfer mechanisms of the type referred to, comprising a supporting finger and a retaining thumb extending substantially at right angles thereto, the free outer end of said supporting finger being shaped to form a slight rise.

19. Actuating mechanism for a loading shoe adapted to advance said shoe in lowered condition and return it to its initial position in raised condition, comprising a rocker plate having a pair of angularly inclined bottom edges, a shaft firmly held in said rocker plate, a carriage arranged to rotatably support said shaft and constrained to movement along a linear path, and means engaging the top of said rocker plate for reciprocating said carriage along said linear path, said loading shoe being firmly supported from said shaft.

20. Actuating mechanism for a loading shoe adapted to advance said shoe in lower condition and return it to its initial position in raised condition, comprising a rocker plate having a pair of angularly inclined bottom edges, a shaft firmly held in said rocker plate in the vertex of said inclined bottom edges, a carriage having a flat upper surface arranged to rotatably support said shaft directly above said upper surface and constrained to movement along a linear path, and means engaging the top of said rocker plate for reciprocating said carriage along said linear path, said loading shoe being firmly supported from said shaft.

21. Mechanism according to claim 20 wherein said rocker plate is of anchor shape, said angularly inclined edges being formed by the opposite arms of said anchor.

22. Mechanism according to claim 20 wherein said carriage is a plate arranged to slide in a pair of parallel guide grooves.

23. A container ejector mechanism for case loading chutes comprising a rocker plate having angularly inclined bottom edges, a horizontal shaft firmly held in said rocker plate at the vertex of said angularly inclined edges, a carriage disposed above and rearwardly of the loading chute and constrained to horizontal movement, said shaft being rotatably mounted upon said carriage, a number of forwardly extending pusher arms firmly mounted upon said shaft, another arm projecting rearwardly from said shaft, a counter-weight for said pusher arms mounted upon said last mentioned arm, and means engaging the top of said rocker plates for reciprocating said carriage.

24. A case loading arrangement comprising a loading chute, a horizontally disposed base plate constrained to horizontal movement above and rearwardly of said chute, a transverse horizontal shaft rotatably supported from said base plate, a pair of vertically positioned rocker plates having forwardly and rearwardly extending angularly inclined bottom edges, said rocker plates being firmly secured to said shaft at the vertices of their angularly inclined bottom edges in a manner permitting either of said edges to contact the upper surface of said plate depending upon the rotary position of said shaft, a number of forwardly extending arms having flat end surfaces mounted firmly upon said shaft, and means engaging the upper ends of said rocker plates for reciprocating said plate.

25. Arrangement according to claim 24, wherein said reciprocating means comprises a pair of vertical actuator arms pivotally mounted at their lower ends and having slots in their upper ends, a second transverse shaft rotatably supported in said slots and extending through the upper ends of said rocker plates, and crank means for oscillating said actuator arms.

26. A container ejecting mechanism for a loading chute comprising a number of loading shoes, means for reciprocating said shoes in the direction of their associated loading chute, and means responsive to the direction of movement imparted to said loading shoes to automatically vary the level of said loading shoes relatively to said chute.

27. Arrangement according to claim 26, wherein said last mentioned means is arranged to lower said loading shoes into said chute initially of a forward stroke of said loading shoes and to raise said loading shoes above said chute initially of a rearward stroke thereof.

28. In a case loading arrangement including a container supply line, and a case loading chute spaced from the forward end of said container supply line, a mechanism comprising a container receiving ramp forming a continuation of said container supply line, said ramp being adapted to accommodate a predetermined number of containers, cyclically operable means for transferring the containers assembled on said receiving ramp to said loading chute, and means responsive to operation of said transfer means for temporarily blocking access to said ramp.

29. In a case loading arrangement including a container supply line and a case loading chute spaced from the forward end of said container supply line; a mechanism comprising a container receiving ramp forming a continuation of said container supply line, said ramp being adapted to accommodate a predetermined number of containers, cyclically operable means for transferring the containers assembled on said receiving ramp to said loading chute, and means responsive to commencement of operation of said transfer means for forcing backwards from said ramp containers in excess of said predetermined number.

30. In a case loading arrangement having a multi-lane container supply line and a case loading chute spaced from the forward end of said supply line; a container transfer mechanism comprising a cyclically operable main shaft; a plurality of auxiliary shafts supported from and arranged in angularly equi-spaced relation about said shaft; a set of transfer fingers, one for each of the lanes of said supply line, supported from each of said auxiliary shafts; bars disposed at either side of the circular orbits of said transfer fingers adjacent to and at the same level as said container supply line to form a container receiving ramp for each of the transfer fingers of said sets adapted to accommodate a predetermined number of longitudinally adjacent containers, the arrangement being such that whenever said main shaft is at rest one of said auxiliary shafts with its set of transfer fingers is aligned with said ramps; stop means disposed at the end of said ramps adjacent to said supply line; yieldable means for urging said stop means into ineffective positions; and means operated by movement of an auxiliary shaft beyond a position of alignment with said ramps for temporarily rendering said stop means effective.

31. Arrangement according to claim 30 comprising rollers pivoted to the ends of said auxiliary shafts and a lever yieldably held within the circular orbits of said rollers at a level slightly above said ramp, said lever being operatively connected with said stop means in a manner adapted to place said stop means into effective positions, whenever said lever is cammed out of the circular orbit of said rollers.

32. A transfer bridge conducting containers from the end of a moving conveyor belt onto a stationary ramp, comprising a plate interposed between said ramp and said belt with its rearwardly directed edge disposed adjacently to the end of said belt at the level of its upper run, and a tongue extending rearwardly from said plate laterally along said belt and having its free end turned downwardly below the upper level of said belt.

33. Arrangement for dividing a procession of containers advancing in upright condition upon a horizontal conveyor belt, comprising the combination of a pair of rotors mounted in spaced parallel relation at either side of said belt to form a gate, said rotors having container-deflecting and container-receiving elements in alternate succession circumferentially thereof and means coupling said rotors for unitary rotation in opposite directions at a phase difference adapted to continually oppose deflecting elements with receiving elements within said gate; with a freely rotatable vertical rod positioned centrally of said belt at a point beyond said gate.

34. A chute for loading tiers of containers into a case, crate or the like, comprising a floor formed by a plurality of parallel angle bars transversely spaced from one another and mounted with their corners pointing in upward direction to form a plurality of longitudinal container guiding channels, a pair of side walls slidably supported on either side of said floor near the container-receiving end thereof, and means yieldably urging said walls toward one another at the discharge end thereof.

35. A case loading machine comprising a container receiving station, a case-loading chute and a container transfer mechanism adapted to transfer containers from said receiving station to said chute, said transfer mechanism comprising a horizontal carrier rod arranged eccentrically with respect to a horizontal axis, a transfer finger mounted on said carrier rod, means for rotating said carrier rod about said horizontal axis in a direction from said container receiving station to said loading chute, and means controlling the angular position of said transfer finger during rotation of said rod about said horizontal axis.

36. A case loading machine for transferring containers from a supply line into a case, crate, or the like, including a container receiving ramp; a case loading chute and a container transfer mechanism adapted to simultaneously transfer a predetermined number of containers from said container receiving ramp into said chute, said transfer mechanism comprising a horizontal carrier rod arranged eccentrically with respect to a horizontal axis, a transfer finger pinned to said carrier rod, means for rotating said rod about said horizontal axis, and means controlling the angular position of said transfer finger during rotation of said rod about said horizontal axis.

37. In a case loading machine having a container receiving station adapted to receive containers in upright condition and a case loading chute spaced from said container receiving station; a container transfer mechanism adapted to simultaneously lift a predetermined number of upright containers from said receiving station and deposit them in superposed lying-down condition into said chute, comprising a horizontally disposed main operating shaft; an auxiliary shaft supported from and arranged eccentrically with respect to said main operating shaft, said auxiliary shaft being rotatable about its individual center axis; a container transfer arm pinned to said auxiliary shaft; cyclically operable means for turning said main shaft; and means for controlling the angular position of said transfer arm during rotation of said main shaft, including a lever rigidly connected to the end of said auxiliary shaft and stationary cam means adapted to engage rollers pivoted to said lever.

38. A transfer mechanism according to claim 37 wherein said transfer arm is composed of a lifting finger and a retaining thumb extending substantially at right angles to said finger.

CHARLES E. KERR.

References Cited in the file of this patent

UNITED STATES PATENTS

| Number | Name | Date |
|---|---|---|
| 860,075 | Bastian | July 16, 1907 |
| 1,243,406 | Hawthorne | Oct. 16, 1917 |
| 2,047,272 | Kimball et al. | July 14, 1936 |
| 2,050,547 | Thayer | Aug. 11, 1936 |
| 2,109,294 | Kimball et al. | Feb. 22, 1938 |
| 2,127,924 | Kimball et al. | Aug. 23, 1938 |
| 2,206,279 | Ferguson | July 2, 1940 |
| 2,273,509 | Braren | Feb. 17, 1942 |
| 2,363,189 | Magnusson | Nov. 21, 1944 |
| 2,404,232 | Hunter | July 16, 1945 |
| 2,472,563 | Bourland | June 7, 1949 |